US007155836B2

(12) United States Patent
Kwon et al.

(10) Patent No.: US 7,155,836 B2
(45) Date of Patent: Jan. 2, 2007

(54) METHOD AND APPARATUS FOR USING MAGNETIC FIELD

(75) Inventors: Woong Kwon, Gyeonggi-do (KR);
Kyung-shik Roh, Gyeonggi-do (KR);
Woo-sup Han, Gyeonggi-do (KR);
Young-bo Shim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 85 days.

(21) Appl. No.: 10/951,913

(22) Filed: Sep. 29, 2004

(65) Prior Publication Data

US 2005/0126023 A1 Jun. 16, 2005

(30) Foreign Application Priority Data

Dec. 13, 2003 (KR) ............... 10-2003-0090938

(51) Int. Cl.
*G01C 17/38* (2006.01)
(52) U.S. Cl. .................................. 33/356; 702/93
(58) Field of Classification Search ............ 33/356, 33/361, 362, 355 R; 324/202, 244, 249, 324/251, 258, 260; 73/1.76; 702/92, 93; 701/224
See application file for complete search history.

(56) References Cited

U.S. PATENT DOCUMENTS

| 4,673,878 | A | * | 6/1987 | Tsushima et al. ........... 324/226 |
| 4,698,912 | A | * | 10/1987 | Fowler et al. ................ 33/356 |
| 4,733,179 | A | | 3/1988 | Bauer et al. |
| 5,187,872 | A | * | 2/1993 | Dufour ........................ 33/356 |
| 5,287,297 | A | * | 2/1994 | Ihara et al. ................... 702/93 |
| 6,014,610 | A | | 1/2000 | Judge et al. |
| 6,301,794 | B1 | | 10/2001 | Parks et al. |
| 6,922,647 | B1 | * | 7/2005 | Cho et al. .................... 702/92 |
| 6,922,902 | B1 | * | 8/2005 | Schierbeek et al. .......... 33/356 |
| 2003/0115764 | A1 | * | 6/2003 | Schierbeek et al. .......... 33/356 |
| 2003/0167121 | A1 | | 9/2003 | Ockerse et al. |
| 2006/0021238 | A1 | * | 2/2006 | Sato et al. .................... 33/356 |
| 2006/0156564 | A1 | * | 7/2006 | Kwon et al. ............... 33/355 R |

FOREIGN PATENT DOCUMENTS

| EP | 0 451 839 A2 | 10/1991 |
| JP | 07 110987 | 4/1995 |

OTHER PUBLICATIONS

European Search Report dated Mar. 17, 2005.

* cited by examiner

*Primary Examiner*—R. Alexander Smith
(74) *Attorney, Agent, or Firm*—Buchanan Ingersoll & Rooney PC

(57) ABSTRACT

Provided a method and apparatus for using a magnetic field. The method includes: measuring and storing magnetic field data indicating magnitudes of a magnetic field in different directions at each time by rotating sensors over a space; and checking whether a disturbance of the magnetic field exists, using curve fitting parameters such as amplitude and offset of at least one of magnetic field trajectories formed by the stored magnetic field data.

21 Claims, 17 Drawing Sheets

METHOD AND APPARATUS FOR USING MAGNETIC FIELD

This application claims the priority of Korean Patent Application No. 2003-90938, filed on Dec. 13, 2003, in the Korean Intellectual Property Office, the disclosure of which is incorporated herein in its entirety by reference.

BACKGROUND OF THE INVENTION

1. Field of the Invention

The present invention relates to using of a magnetic field, and more particularly, to a method and apparatus for using a magnetic field to check whether disturbance of a magnetic field exists and to use the check result.

2. Description of the Related Art

Hereinafter, a conventional method of calibrating a magnetic compass (hereinafter referred to as a compass), which is mounted in a mobile robot so as to recognize an azimuth of the mobile robot, will be described with reference to the attached drawings.

In general, the compass mounted in the mobile robot must be calibrated so as to reduce the distortion of the azimuth thereof caused by a magnetic field generated from the mobile robot.

FIG. 1 is a view for showing a circle formed on x- and y-axes using magnetic field values sensed by magnetic field sensors in a linear magnetic flux environment.

The compass in the mobile robot, for example, includes two magnetic field sensors (not shown) which are disposed to be orthogonal to each other. When the magnetic field values sensed by the magnetic field sensors are projected on a 2-dimensional plane with the rotation of more than 360° of the mobile robot, a circle as shown in FIG. 1 is formed. Here, the azimuth of the compass corresponds to an angle at which coordinates on the circle form with x- or y-axis of FIG. 1.

FIG. 2 is a view for showing a circle formed on x- and y-axes using binary magnetic field values sensed by magnetic field sensors in a linear magnetic flux environment.

The magnetic field values sensed by the magnetic field sensors and then a digital computer substantially exist in the binary digit form. Thus, when sensed positive magnetic field values are projected on a 2-dimensional plane, the center of the circle may be offset as shown in FIG. 2. Here, the offset of the center of the circle may also be caused due to disturbance of the magnetic field.

FIG. 3 is a view for showing a circle formed on x- and y-axes using binary magnetic field values sensed by magnetic field sensors when disturbance of a magnetic field exists.

When the binary magnetic field values sensed within a curved magnetic flux in which the disturbance of the magnetic field exists are projected on a 2-dimensional plane, the center of the circle has an offset and the circle is distorted, as shown in FIG. 3.

Here, the calibration of the compass means the work of transforming a circle with the offset at its center or a distortion as shown in FIG. 2 or 3 into the circle of FIG. 1. For this purpose, the conventional calibration method uses a one-to-one function or calibration parameters. However, since the surroundings of a mobile robot vary with the traveling of the mobile robot, the one-to-one function or the calibration parameters cannot be continuously used.

FIG. 4 is a view for a 2-dimesionally showing an exemplary traveling figure of a mobile robot. Here, dotted lines denote a magnetic flux.

In general, in the conventional calibration method, it is supposed that a linear magnetic flux predominately exists in a current location of a compass to be calibrated. For example, as shown in FIG. 4, a compass mounted in a mobile robot 4 is calibrated in a predetermined location 2 in which a linear magnetic flux predominates, using the conventional calibration method. Next, the compass moves in a direction indicated by an arrow. Here, the linear magnetic flux appears in the Earth's magnetic field. However, the compass to be calibrated using the conventional calibration method may be located in an indoor environment in which a human resides or in an outdoor environment around which many kinds of metal such as steel concrete or the like exist. In this case, a magnetic field is distorted by a metal or a magnetic substance. Thus, the above supposition of the conventional calibration method cannot be given.

FIG. 5 is a view for a 2-dimensionally showing an exemplary traveling figure of a mobile robot. Here, a linear magnetic flux may be changed into a curved magnetic flux due to disturbance of the magnetic field in an indoor environment or in an outdoor environment around which many kinds of metal exist.

As shown in FIG. 5, when a compass mounted in a mobile robot 8 is calibrated in an arbitrary location 6 within a curved magnetic flux using the conventional calibration method, the compass may not be accurately calibrated. As a result, the calibrated compass may not accurately reflect a traveling direction of the mobile robot 8.

U.S. Pat. No. 6,014,610 discloses a method of preventing compass data used for calibration from being distorted. In the disclosed method, when disturbance of a magnetic field is doubtful, a compass transiently stops operating. Next, when the magnetic signature of a mobile body changes, the compass is recalibrated. The disclosed method does not present a counterplan for inaccurate calibration occurring in an environment affected by a magnetic disturbance.

U.S. Pat. No. 6,301,794 discloses a method of calibrating in real-time a magnetic field varying when a mobile body with a compass travels. In the disclosed method, the circle of FIG. 3 may be changed into the circle of FIG. 1. However, the azimuth of the compass cannot be calibrated. In other words, a point on the distorted circle of FIG. 3 may correspond to a point on the circle of FIG. 1 on a one-to-one basis. However, whether the corresponding points can form a right azimuth is not sure. Thus, the disclosed method cannot obtain a more accurate azimuth than a calibration method performed within a magnetic field in which a linear magnetic flux flows.

In addition, a high-priced magnetic field measurer is required to check whether a magnetic disturbance exists. Moreover, in a case where the high-priced magnetic field measurer is mounted in a mobile robot, the high-priced magnetic field measurer hinders the practical use of the mobile robot.

SUMMARY OF THE INVENTION

The present invention provides a method of using a magnetic field to simply check whether disturbance of the magnetic field exists and to move a compass to an appropriate location according to the check result to accurately calibrate the compass.

The present invention provides an apparatus for using a magnetic field to simply check whether disturbance of the magnetic field exists and to move a compass to an appropriate location according to the check result to accurately calibrate the compass.

According to an aspect of the present invention, there is provided a method of using a magnetic field, including: measuring and storing magnetic field data indicating magnitudes of a magnetic field in different directions at each time by rotating sensors over a space; and checking whether disturbance of the magnetic field exists using curve fitting parameters such as amplitude and offset of at least one of magnetic field trajectories formed by the stored magnetic field data.

According to another aspect of the present invention, there is provided an apparatus for using a magnetic field, including: a magnetic field measurer which measures magnetic field data indicating magnitudes of a magnetic field at each time while rotating sensors over a space; a storage which stores the measured magnetic field data; and a magnetic field disturbance checker which checks whether a disturbance of the magnetic field exists using curve fitting parameters such as amplitude and offset of at least one of magnetic field trajectories formed by the stored magnetic field data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method of using a magnetic field, according to the present invention, will be described with reference to the attached drawings.

Figure 1:
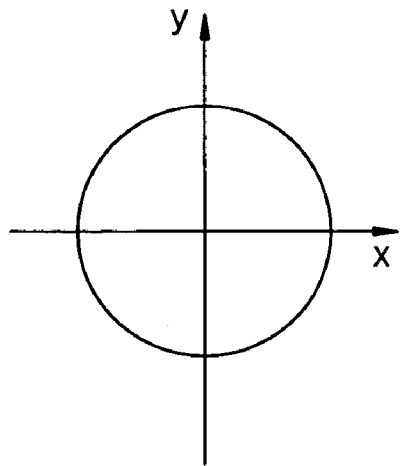
FIG. 1 is a view for showing a circle formed on x- and y-axes using magnetic field values sensed by magnetic field sensors in a linear magnetic flux environment.
Figure 2:
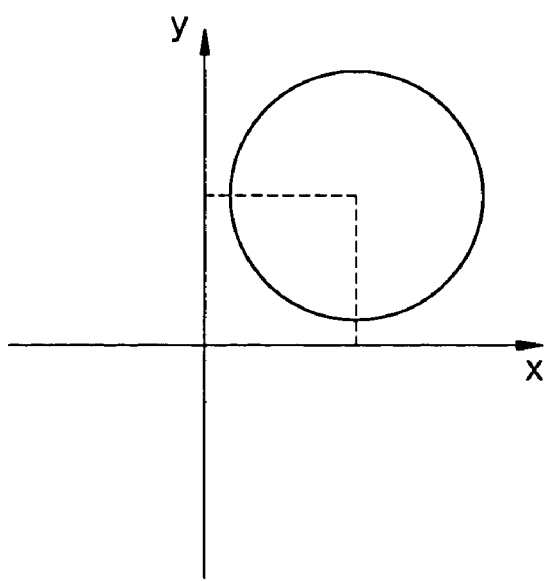
FIG. 2 is a view for showing a circle formed on x- and y-axes using binary magnetic field values sensed by magnetic field sensors in a linear magnetic flux environment.
Figure 3:
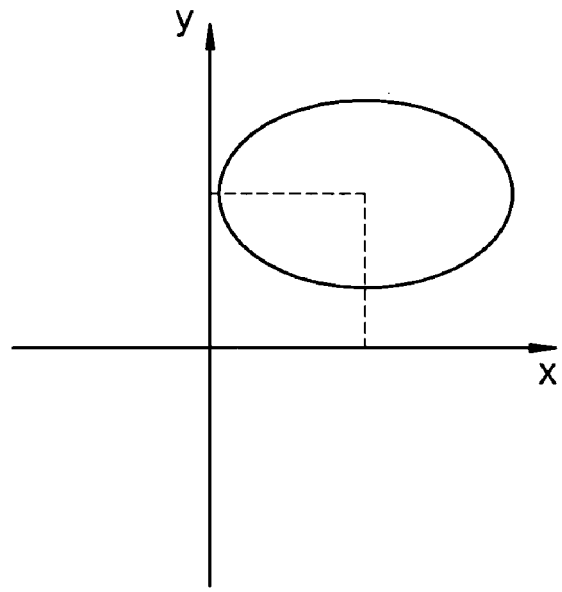
FIG. 3 is a view for showing a circle formed on x- and y-axes using binary magnetic field values sensed by magnetic field sensors when disturbance of the magnetic field exists.
Figure 4:
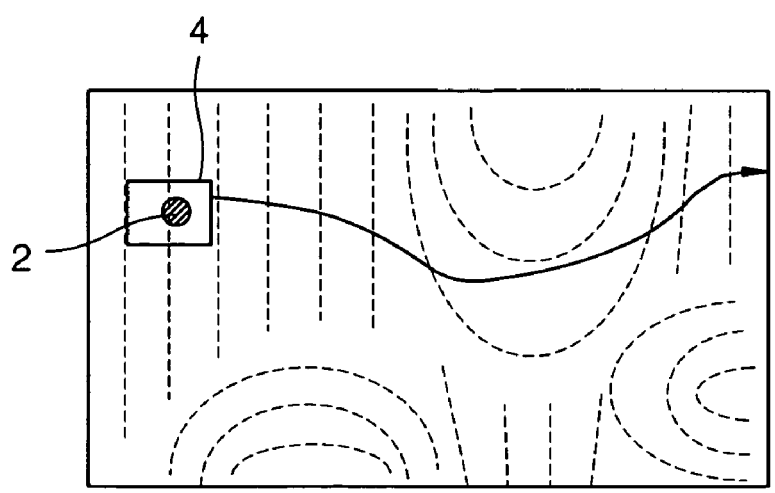
FIG. 4 is a view for a 2-dimesionally showing an exemplary traveling figure of a mobile robot.
Figure 5:
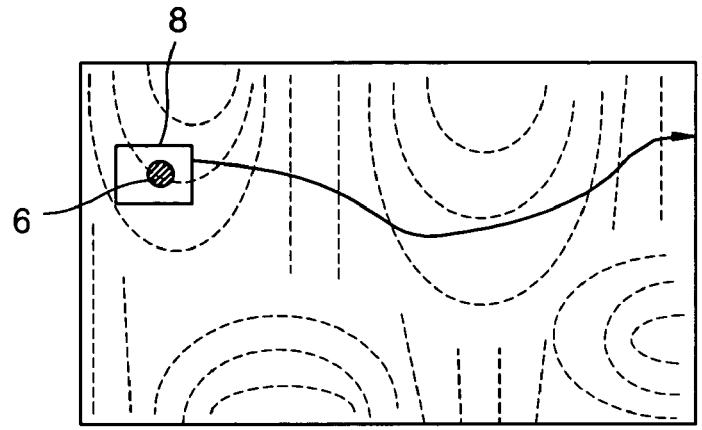
FIG. 5 is a view for a 2-dimensionally showing an exemplary traveling figure of a mobile robot.
Figure 6:
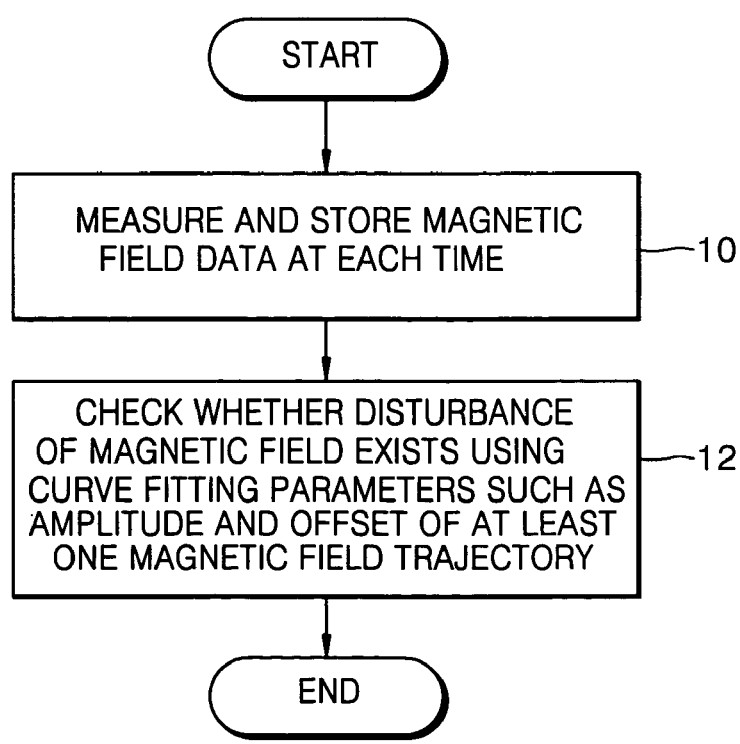
FIG. 6 is a flowchart for explaining a method of using a magnetic field, according to an embodiment of the present invention.

FIG. 6 is a flowchart for explaining a method of using a magnetic field, according to an embodiment of the present invention. The method includes step 10 of measuring and storing magnetic field data and step 12 of checking whether disturbance of a magnetic field exists.

In step 10, magnetic field data is measured and stored at each period of time with the rotation of sensors in different directions over a space. Here, the magnetic field data denotes magnitudes of a magnetic field in different directions and may be sensed by magnetic field sensors (hereinafter referred to as sensors). The sensors face different directions over the space and for example, correspond to fluxgate sensors. For example, two sensors may be disposed to be orthogonal to each other.

According to the present invention, in order to measure the magnetic field data, the above-described sensors may rotate more than or equal to a predetermined angle, preferably, 360° or more. In a case where a compass (not shown) mounted in a mobile body (not shown) such as a mobile robot or a mobile vehicle includes such sensors, the mobile body rotates instead of the sensors.

Figure 7:
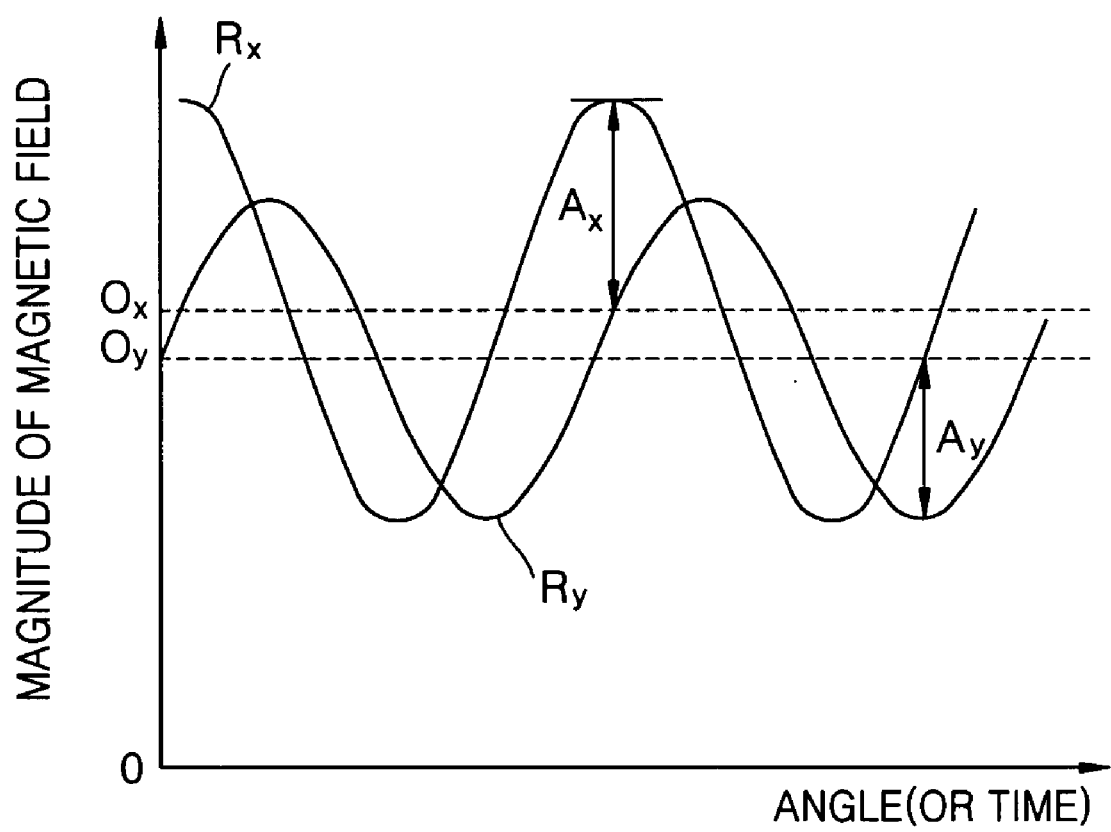
FIG. 7 is a graph for showing exemplary waveforms of magnetic field data measured and stored in step 10 of FIG. 6.

FIG. 7 is a graph for showing exemplary waveforms of the magnetic field data measured and stored in step 10 of FIG. 6. Here, the widthwise axis denotes each period of time at which the magnitude of a magnetic field is measured, and the lengthwise axis denotes the magnitude of the magnetic field. Here, the magnitudes of the magnetic field may be binary data greater than "0", and, when the sensors rotate at a uniform velocity, the widthwise axis may denote the rotation angle of the sensors.

For example, in an event that two sensors are installed to measure the magnitudes of the magnetic field, as shown in FIG. 7, magnetic field data $R_x$ and $R_y$ may be measured and stored at each period of time. Here, the magnetic field data $R_x$ and $R_y$ form approximately sinusoidal magnetic field trajectories.

After step 10, in step 12, a determination is made whether disturbance of the magnetic field exists, using curve fitting parameters such as amplitude and offset of at least one of magnetic field trajectories formed by the stored magnetic field data.

While, while the present invention has been exemplarily described with the assumption that the magnetic field data $R_x$ and $R_y$ are represented as shown in FIG. 7, the present invention is not limited to this.

According to an aspect of the present invention, a determination of whether the disturbance of the magnetic field exists may be made using amplitude $A_x$ and offset $O_x$ of the magnetic field trajectory formed by the magnetic field data $R_x$. Approximately, the amplitude $A_x$ may be determined as half the difference between maximum and minimum values of the magnetic field data $R_x$ and the offset $O_x$ may be determined as a median value of the maximum and minimum values of the magnetic field data $R_x$. On the other hand, the amplitude $A_x$ may be determined statistically by curve fitting methods such as Chi-squared fitting.

According to another aspect of the present invention, a determination may be made whether the disturbance of the magnetic field exists, using amplitude $A_y$ and offset $O_y$ of the magnetic field trajectory formed by the magnetic field data $R_y$. Approximately, the amplitude $A_y$ may be determined as half the difference between maximum and minimum values of the magnetic field data $R_y$ and the offset $O_y$ may be determined as a median value of the maximum and minimum values of the magnetic field data $R_y$. On the other hand, the amplitude $A_y$ may be determined statistically by curve fitting methods such as Chi-squared fitting.

According to still another aspect of the present invention, a determination may be made whether the disturbance of the magnetic field exists, using the amplitudes $A_x$ and $A_y$ and offsets $O_x$ and $O_y$ of the magnetic field trajectories formed by the magnetic field data $R_x$ and $R_y$.

Each of embodiments of the present invention of step 12 of FIG. 6 will now be explained with reference to the attached drawings.

Figure 8:
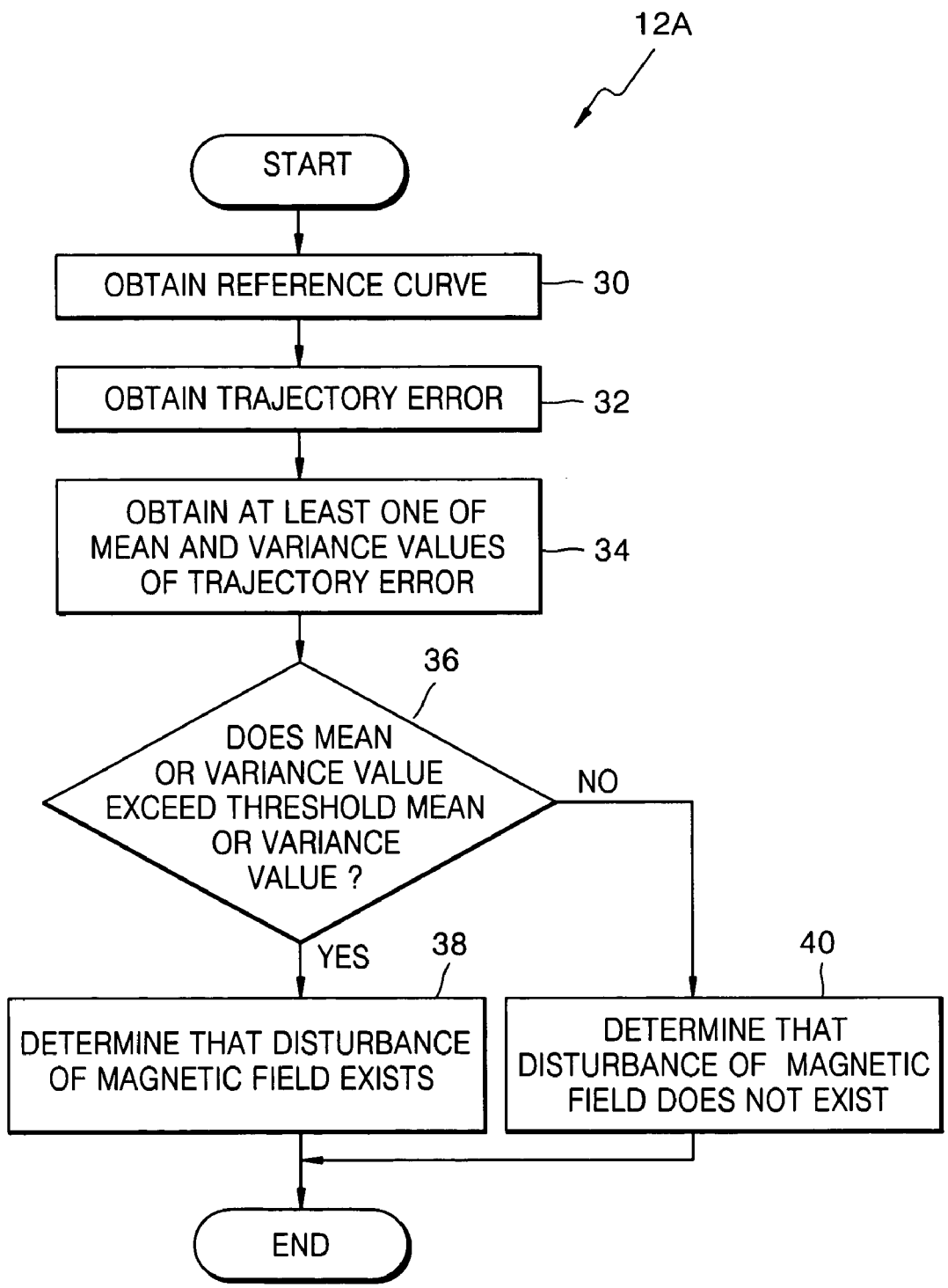
FIG. 8 is a flowchart for explaining a preferred embodiment 12A of the present invention of step 12 of FIG. 6.

FIG. 8 is a flowchart for explaining a preferred embodiment 12A of the present invention of step 12 of FIG. 6, including steps 30, 32, and 34 of obtaining at least one of a mean value and a variance value of a trajectory error and steps 36, 38, and 40 of determining whether a disturbance of the magnetic field exists, depending on whether the mean or variance value exceeds a threshold mean or variance value.

According to an aspect of the present invention, in step 30, at least one sinusoidal reference curve is calculated using amplitude and offset of at least one magnetic field data stored in step 10. In a case of FIG. 7, a sinusoidal reference curve $\hat{R}_x$ can be calculated using the amplitude $A_x$ and the offset $O_x$ of the magnetic field data $R_x$ as in Equation 1:

$$\hat{R}_x = A_x \cos\theta + O_x \qquad (1)$$

wherein θ denotes coordinates on the lengthwise axis of the graph of FIG. 7.

The sinusoidal reference curve $\hat{R}_y$ can also be calculated using the amplitude $A_y$ and the offset $O_y$ of the magnetic field data $\hat{R}_y$ as in Equation 2:

$$\hat{R}_y = A_y \sin\theta + O_y \qquad (2)$$

As a result, according to the embodiment of the present invention, a reference curve may be calculated using amplitude and offset of magnetic field data stored in step 10.

According to another aspect of the present invention, before step 10, a reference curve may be obtained by measuring the magnitude of a magnetic field at each period of time in different positions varying with rotation of sensor in an environment in which a disturbance of the magnetic field does not exist. In this case, step 12A of FIG. 8 is performed without step 10.

Accordingly, the reference curve may be obtained before the method of using the magnetic field according to the present invention is executed or may be obtained in step 10 of the method of using the magnetic field according to the present invention. In any case, the reference curve used in the present invention may be regarded as a magnetic field trajectory formed by magnetic field data measured in a linear magnetic flux appearing in the Earth's magnetic field.

For example, when the method of using the magnetic field according to the present invention of FIG. 6 is applied to a mobile body including a compass having sensors as previously described, a reference curve may be pre-measured and obtained by the manufacturing company of the mobile body or may be obtained from amplitude and offset of magnetic field data measured in an environment in which the mobile body is used as in Equation 1 or 2.

After step 30, in step 32, a trajectory error between the magnetic field trajectory formed by the magnetic field data measured in step 10 and the sinusoidal reference curve is obtained.

Figure 9:
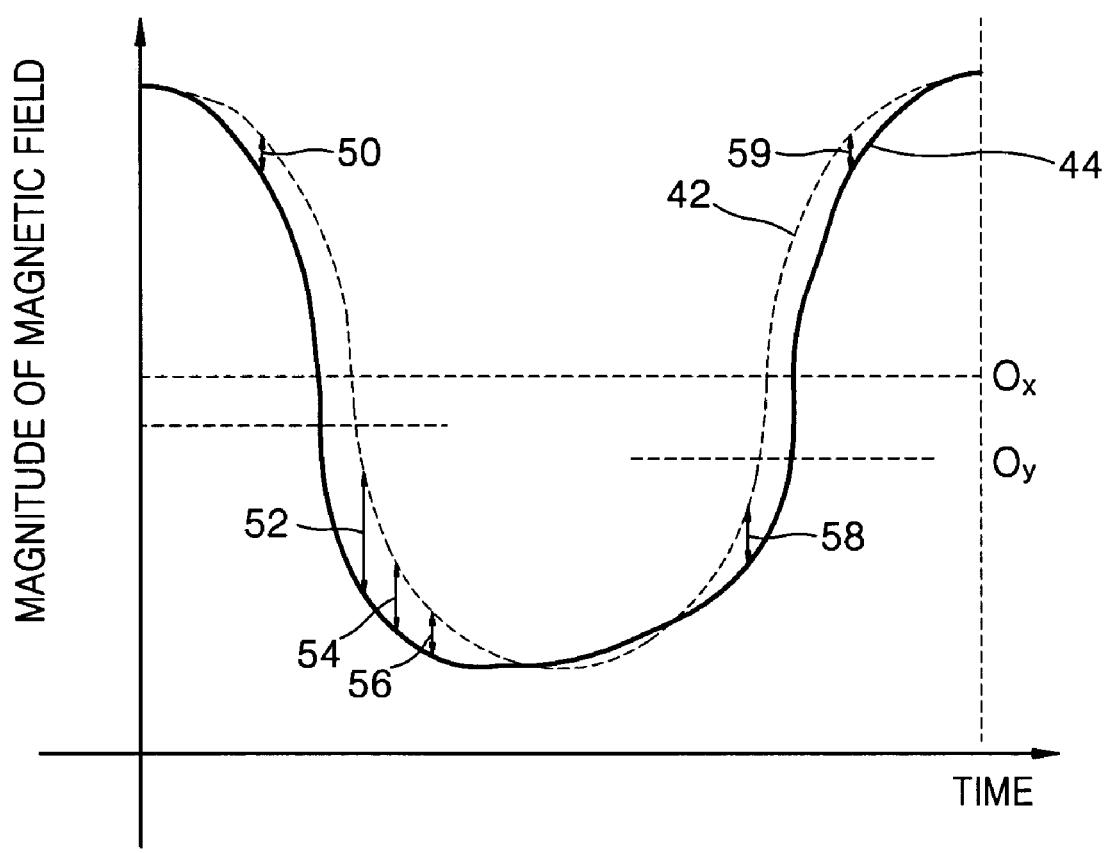
FIG. 9 is an exemplary graph for showing a trajectory error between a reference curve and a magnetic field trajectory.

FIG. 9 is an exemplary graph for showing trajectory errors 50, 52, 54, 56, 58, and 59 between a reference curve 42 and a magnetic field trajectory 44. Here, the widthwise axis denotes time, and the lengthwise axis denotes the magnitude of a magnetic field.

For example, when magnetic field data is represented as shown in FIG. 7 and a reference curve is obtained as in Equation 1, trajectory errors, $e_x$, 50, 52, 54, 56, 58, and 59 between the magnetic field trajectory formed by the magnetic data $R_x$ and a reference curve $\hat{R}_x$ represented as in Equation 1 can be calculated as in Equation 3:

$$e_x = R_x - \hat{R}_x = R_x - A_x \cos\theta - O_x \qquad (3)$$

Alternatively, trajectory errors, $e_y$, 50, 52, 54, 56, 58, and 59 between the magnetic field trajectory formed by the magnetic field data $R_y$ and a reference curve $\hat{R}_y$ represented as in Equation 2 may be calculated as in Equation 4:

$$e_y = R_y - \hat{R}_y = R_y - A_y \sin\theta - O_y \qquad (4)$$

After step 32, in step 34, at least one of a mean value and a variance value of trajectory errors is calculated. For example, a mean value and/or a variance value of the trajectory errors 50, 52, 54, 56, 58, and 59 of FIG. 9 is calculated.

After step 34, in step 36, it is determined whether the mean value or the variance value exceeds a predetermined threshold mean or variance value. For example, it is determined whether the mean value and/or the variance value exceed the threshold mean value and/or the threshold variance value.

If in step 36, it is determined that the mean value or the variance value has exceeded the threshold mean value or threshold variance value, in step 38, it is determined that a disturbance of the magnetic field exists. If in step 36, it is determined that the mean value and the variance value have not exceeded the threshold mean value and the threshold variance value, in step 40, it is determined that the disturbance of the magnetic field does not exist. Here, the fact that the mean value or the variance value has exceeded the threshold mean value and/or the threshold variance value, respectively, means that the magnetic field trajectory is very different from the reference curve. Accordingly, the location in which magnetic data is measured is determined as a location in which disturbance of the magnetic field exists.

Figure 10:
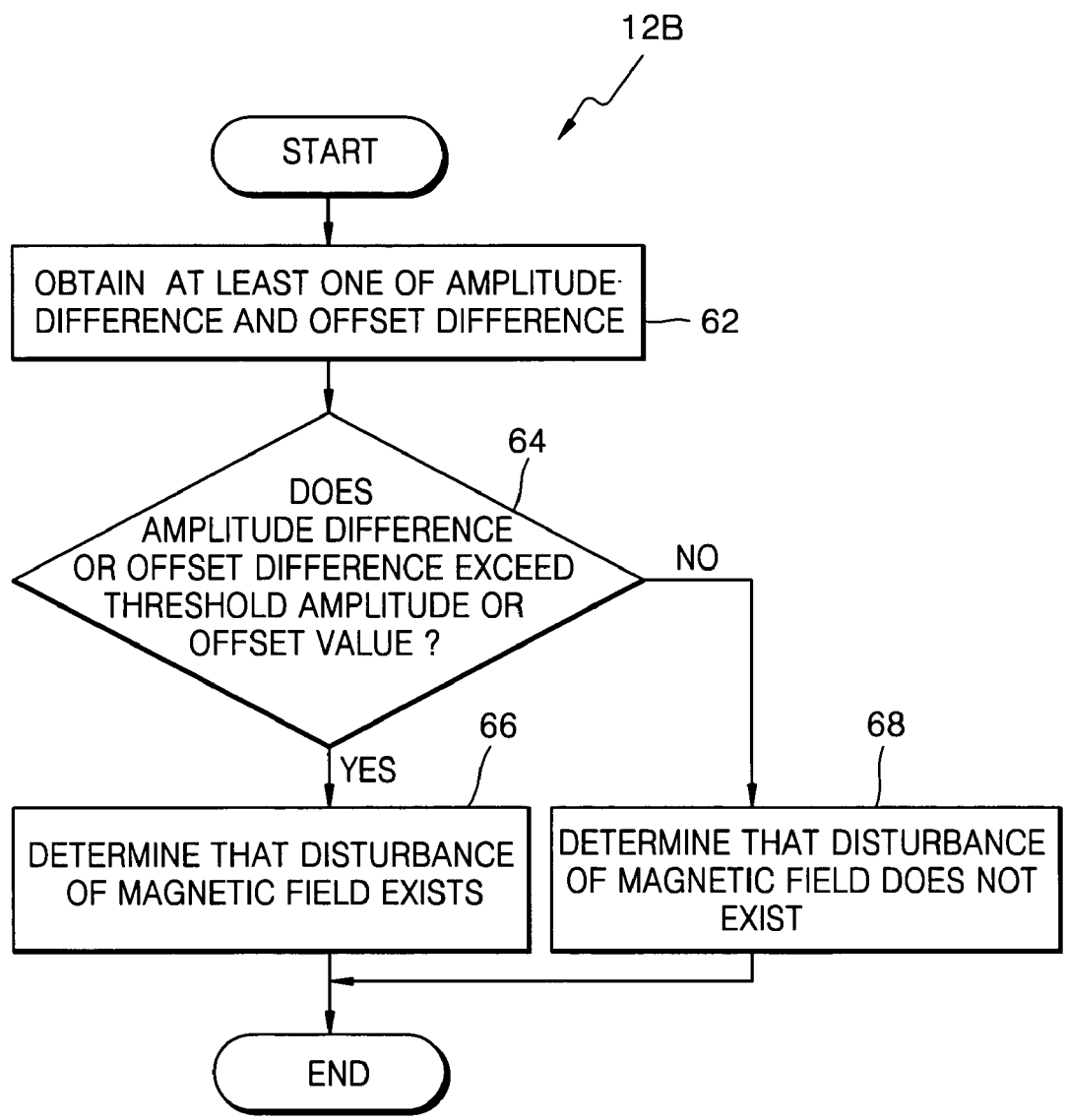
FIG. 10 is a flowchart for explaining another preferred embodiment 12B of the present invention of step 12 of FIG. 6.

FIG. 10 is a flowchart for explaining another preferred embodiment 12B of the present invention of step 12 of FIG. 6, including steps 62, 64, 66, and 68 of determining whether disturbance of the magnetic field exists, using at least one of an amplitude difference and an offset difference.

Referring to FIG. 10, in step 62, at lease one of an amplitude difference and an offset difference is calculated. Here, the amplitude difference denotes a difference between the amplitude of the magnetic field data stored in step 10 and a reference amplitude. Also, the offset difference means a difference between the offset of the magnetic field data stored in step 10 and a reference offset.

According to an aspect of the present invention, the reference amplitude and the reference offset respectively correspond to amplitude and offset on a reference curve which is obtained by measuring the magnitude of a magnetic field at each period of time in different locations in an environment in which disturbance of the magnetic field does not exist, before step 10.

According to another aspect of the present invention, the reference amplitude and the reference offset may be obtained as follows.

Figure 11:
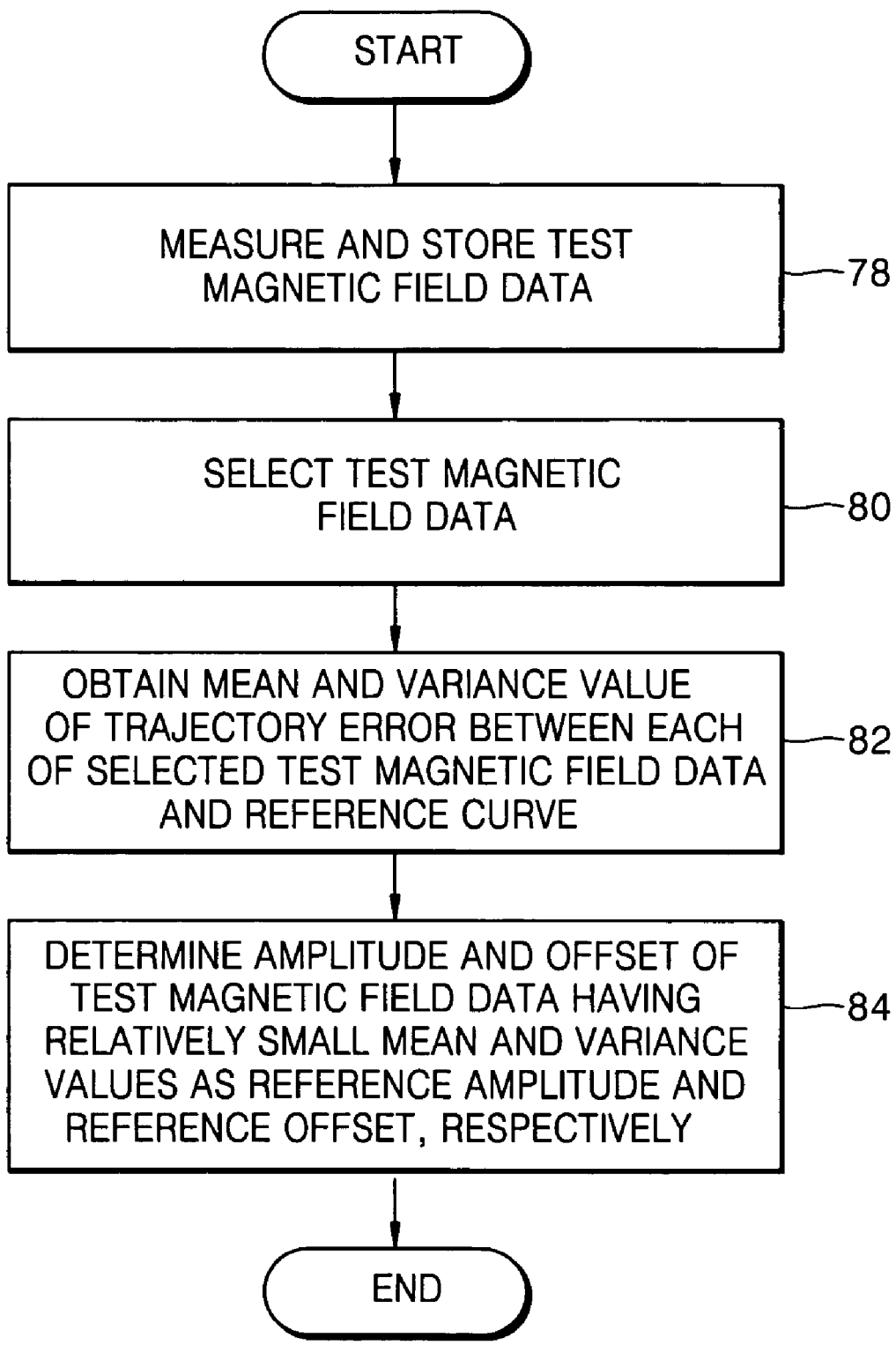
FIG. 11 is a flowchart for explaining an embodiment of a process of obtaining a reference amplitude and a reference offset in the method of using the magnetic field according to the present invention.

FIG. 11 is a flowchart for explaining an embodiment of a process of obtaining a reference amplitude and a reference offset in the method of using the magnetic field according to the present invention, including step 78 of measuring and storing test magnetic field data, step 80 of selecting corresponding test magnetic field data from the stored test magnetic field data, and steps 82 and 84 of determining amplitude and offset of test magnetic field data which have relatively small error mean and error variance values as the reference amplitude and the reference offset.

Referring to FIG. 11, in step 78, a predetermined number of test magnetic field data is measured and stored in several locations over a space. Here, the space refers to a space to which the method of using the magnetic field according to the present invention is applied. For example, when the method of using the magnetic field according to the present invention is applied to a mobile body as previously described, a predetermined number of test magnetic field data is measured and stored over a space in which the mobile body is used.

After step 78, in step 80, test magnetic field data having similar amplitudes and offsets are selected among the test magnetic field data stored in all locations. Here, assuming that locations in which the test magnetic field data having the similar amplitudes and offsets are measured are classified into several location groups, test magnetic field data are obtained from a location group selected from one of the classified location groups so that the selected location group has the most location of the locations groups. This is done because it is possible that the Earth's magnetic field is much larger than the disturbance of the magnetic field at a given point.

After step 80, in step 82, a mean value and a variance value of a trajectory error between each of the selected test magnetic field data and a reference curve are calculated. The mean values and variance values are called error mean values and error variance values, respectively. Thus, the number of error mean values and error variance values obtained is equal to the number of the selected test magnetic field data. Here, the reference curve used for performing step 82 may be formed from magnetic field data that is obtained in a linear magnetic flux environment before the method of FIG. 11 is performed.

In step 84, an amplitude and an offset of test magnetic field data having relatively small error mean and error variance values obtained in step 82 are determined as the reference amplitude and the reference offset. For example, amplitude and offset of test magnetic field data having relatively small error mean and error variance values than other test magnetic field data have determined as the reference amplitude and the reference offset.

Meanwhile, after step 62, in step 64, a determination is made whether the amplitude difference or the offset difference exceeds a threshold amplitude value or a threshold offset value. If in step 64, it is determined that the amplitude difference or the offset difference has exceeded the threshold amplitude value or the threshold offset value, respectively, in step 66, it is determined that the disturbance of the magnetic field exists. If in step 64, it is determined that the amplitude difference and the offset difference has not exceeded the threshold amplitude value and the threshold offset value, in step 68, it is determined that the disturbance of the magnetic field does not exist. In other words, determining that the amplitude difference or the offset difference exceeds the threshold amplitude value or the threshold offset value means that the magnetic field trajectory is greatly different from the reference curve. In this case, in step 66, the location in which magnetic field data is measured is determined as a location in which the disturbance of the magnetic field exists.

Figure 12:
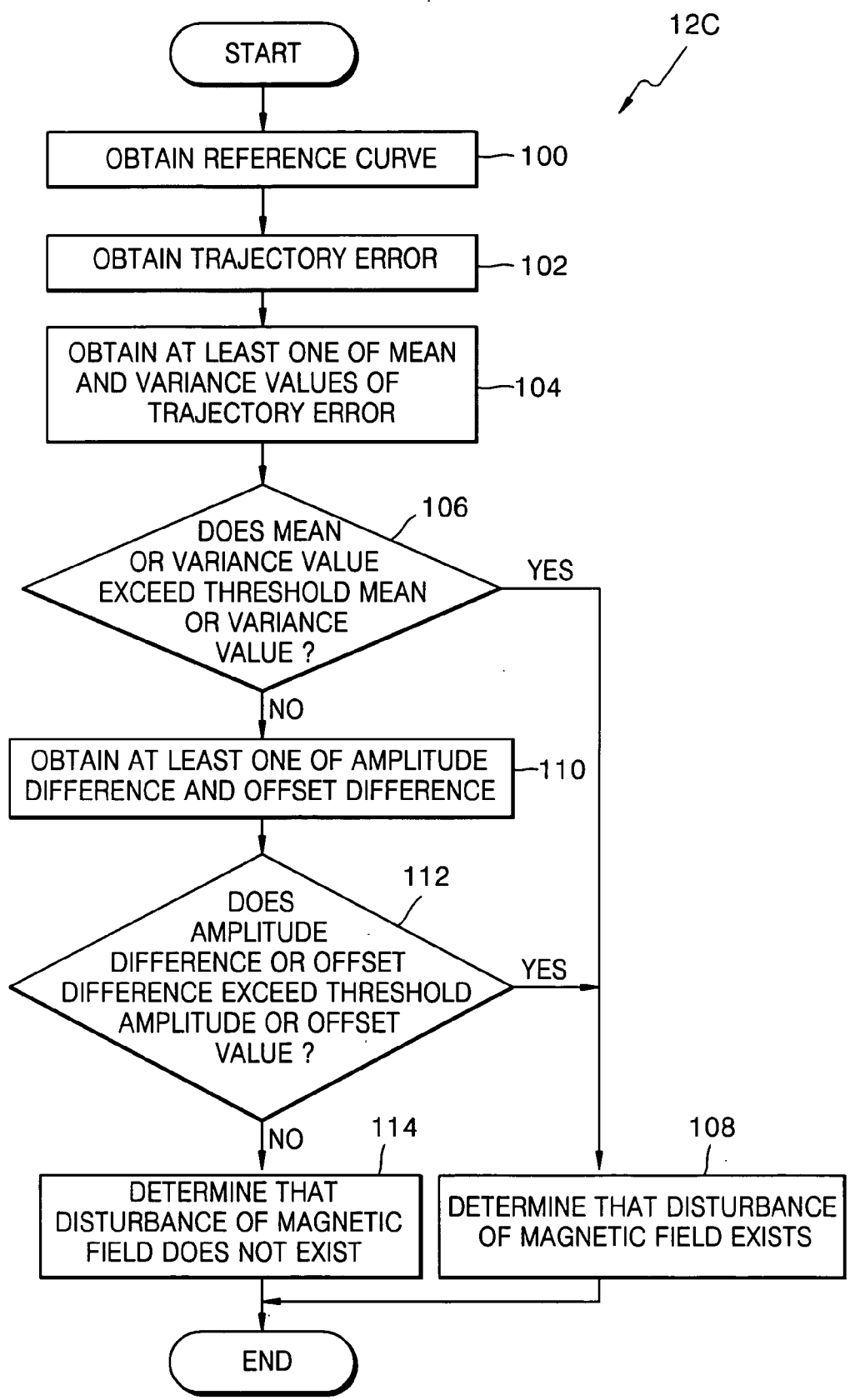
FIG. 12 is a flowchart for explaining still another preferred embodiment 12C of the present invention of step 12 of FIG. 6.

FIG. 12 is a flowchart for explaining still another preferred embodiment 12C of the present invention of step 12 of FIG. 6, including steps 100, 102, 104, and 106 of comparing a mean value or a variance value of a trajectory error with a threshold mean value or a threshold variance value, steps 110 and 112 of comparing an amplitude difference or an offset difference with a threshold amplitude value or a threshold offset value, and steps 108 and 114 of determining whether a disturbance of the magnetic field exists.

Steps 100, 102, 104, and 106 of FIG. 12 are the same as steps 30, 32, 34, and 36 of FIG. 8, respectively. Also, steps 108, 112, and 114 of FIG. 12 are the same as steps 66, 64, and 68 of FIG. 10, respectively. Thus, steps 100, 102, 104, 106, 108, 112, and 114 will not be explained herein.

Step 62 of FIG. 10 is performed after step 10, while step 110 of FIG. 12 is carried out when the error mean and error variance value does not exceed the threshold mean and variance value. Except this point, step 110 of FIG. 12 is the same as step 62 of FIG. 10 and thus will not be explained herein.

According to still another aspect of the present invention, unlike the method illustrated in FIG. 12, step 110 is performed after step 10, and then in step 112, a determination is made whether the amplitude difference or the offset difference exceeds the threshold amplitude value or the threshold offset value. If in step 112, it is determined that the amplitude difference or the offset difference has exceeded the threshold amplitude value or the threshold offset value, the process goes to step 108. If in step 112, it is determined that the amplitude difference and the offset difference has not exceeded the threshold amplitude value and the threshold offset value, the process may not move on to step 114 but return to step 100. Here, after step 100, steps 102 and 104 may be performed, and then step 106 may be performed. If in step 106, it is determined that the error mean and error variance value has exceeded the threshold mean and variance value, the process moves on to step 108. If in step 106, it is determined that the error mean or error variance value has not exceeded the threshold mean or variance value, the process moves on to step 114.

The method of using the magnetic field according to the present invention and the embodiments thereof may be applied to calibrating a compass with sensors as described above. The compass may be mounted in a mobile body as described above and rotate and move over a space. Here, in a case where the compass is not mounted in the mobile body, the compass itself rotates. When the compass is mounted in the mobile body, the mobile body may rotate.

A process of calibrating a compass of the method of using the magnetic field according to the present invention will now be described with reference to FIG. 13.

Figure 13:
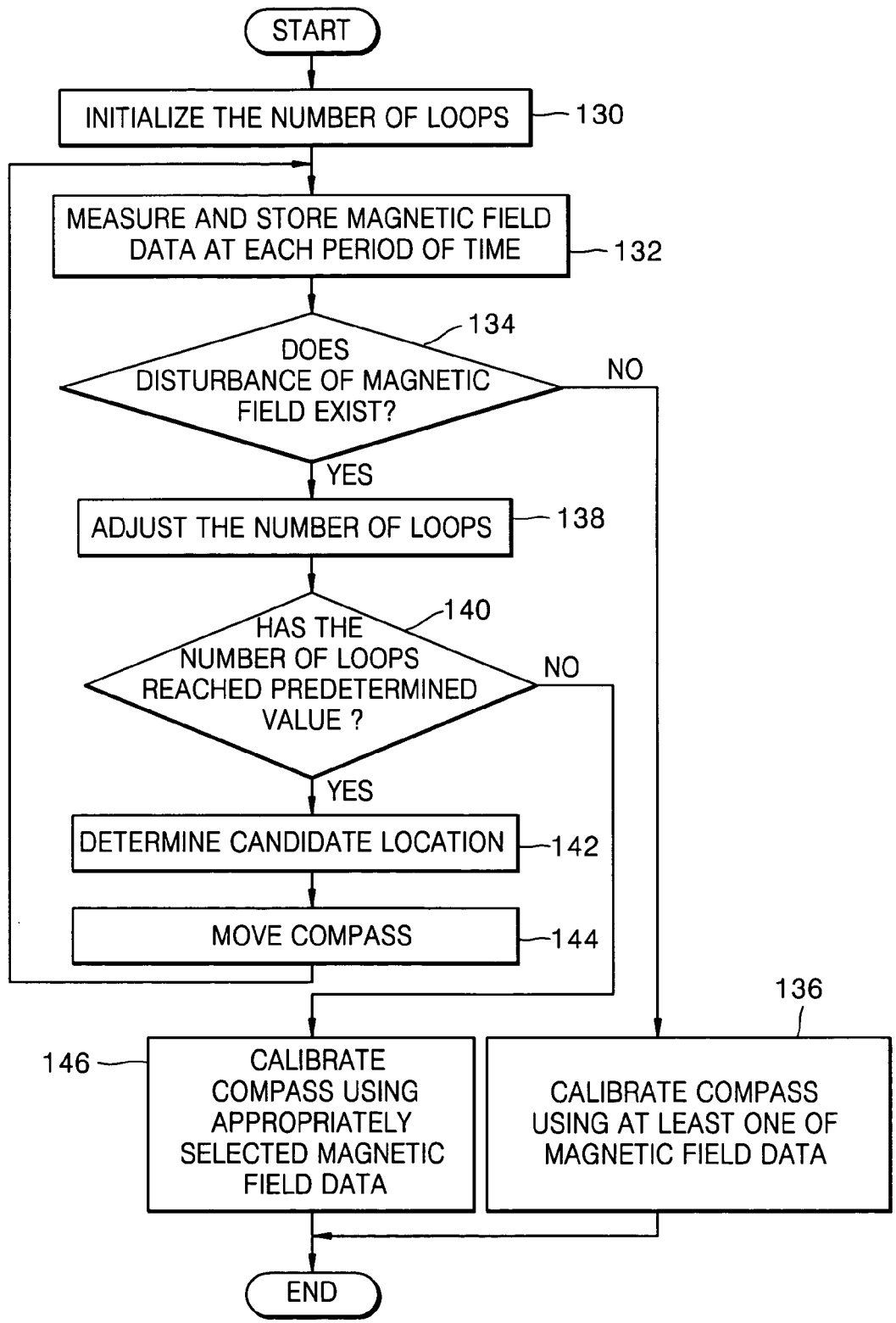
FIG. 13 is a flowchart for explaining a process of calibrating a compass in the method of using magnetic field according to an embodiment of the present invention.

FIG. 13 is a flowchart for explaining an embodiment of a process of calibrating a compass of the method of using the magnetic field according to the present invention, including steps 130 and 132 of measuring and storing magnetic field data, step 134 of checking whether a disturbance of the magnetic field exists, steps 138, 140, 142, and 144 of calculating a candidate location to which the compass will move when disturbance of the magnetic field exists, and steps 136 and 146 of calibrating the compass.

Steps 132 and 134 of FIG. 13 correspond to steps 10 and 12 of FIG. 6, respectively and thus will not be explained herein. Thus, the embodiments of step 12 may be applied to step 134.

In step 130, the number of loops is initialized and then the process moves on to step 132.

If in step 134, it is determined that the disturbance of the magnetic field does not exist, in step 136, the compass is calibrated using at least one of magnetic field data stored in step 132. For example, amplitude and offset of at least one magnetic field data are determined as calibration parameters, and then the compass is calibrated using the determined calibration parameters.

If in step 134, it is determined that the disturbance of the magnetic field exists, in step 138, the number of loops is adjusted. After step 138, in step 140, a determination is made whether the adjusted number of loops reaches a predetermined value.

According to an aspect of the present invention, in step 130, the number of loops may be initialized to "0". In step 138, the number of loops may be increased by "1" when disturbance of the magnetic field exists. In step 140, a determination may be made whether the number of loops has reached a predetermined number.

According to another aspect of the present invention, in step 130, the number of loops may be initialized to a predetermined number. In step 138, the number of loops may be decreased by "1" when disturbance of the magnetic field exists. In step 140, a determination is made whether the number of loops has reached the predetermined value, i.e., "0".

If in step 140, it is determined that the adjusted number of loops has not reached the predetermined value, in step 142, a candidate location of the central axis around which the compass rotates is determined using a mean value of trajectory errors, amplitude and offset of magnetic field data, and reference amplitude and reference offset. After step 142, in step 144, the compass moves so as to correspond to the determined candidate location, and then the process returns to step 132.

Hereinafter, a process of determining a candidate location of the method of using the magnetic field according to the present invention will be described with referenced to the attached drawings.

During the measurement of the magnetic field data in step 132, a direction along which the compass moves toward a candidate location from the central axis around which the compass rotates is determined to the right of a magnetic north indicated by the compass when a mean value of trajectory errors is negative. The direction is determined to the left of the magnetic north when the mean value of the trajectory errors is positive. Here, a trajectory error refers to a result of subtraction of a reference curve from a magnetic field trajectory formed by magnetic field data measured in step 132. Here, a direction $\theta_T$ along which the compass moves can be represented as in Equation 5:

$$\theta_T = \theta_N + (-1)^n E\theta' \quad (5)$$

wherein $\theta_N$ denotes the magnetic north indicated by the compass, n is set to "0" when the mean value of the trajectory errors is positive and "1" when the mean value of the trajectory errors is negative, and $\theta'$ denotes an angle by which the compass will rotate, for example, $\pi/2$.

Thus, when n=0, the direction $\theta_T$ along which the compass is to move to a candidate location is a direction which is $\theta'$ greater than the magnetic north $\theta_N$, i.e., a direction which is obtained by adding an angle $\theta'$ counterclockwise to the magnetic north $\theta_N$. However, when n=1, the direction $\theta_T$ along which the compass is to move to the candidate location is a direction which is $\theta'$ smaller than the magnetic north $\theta_N$, i.e., a direction which is obtained by adding the angle $\theta'$ clockwise to the magnetic north $\theta_N$.

Figure 14:
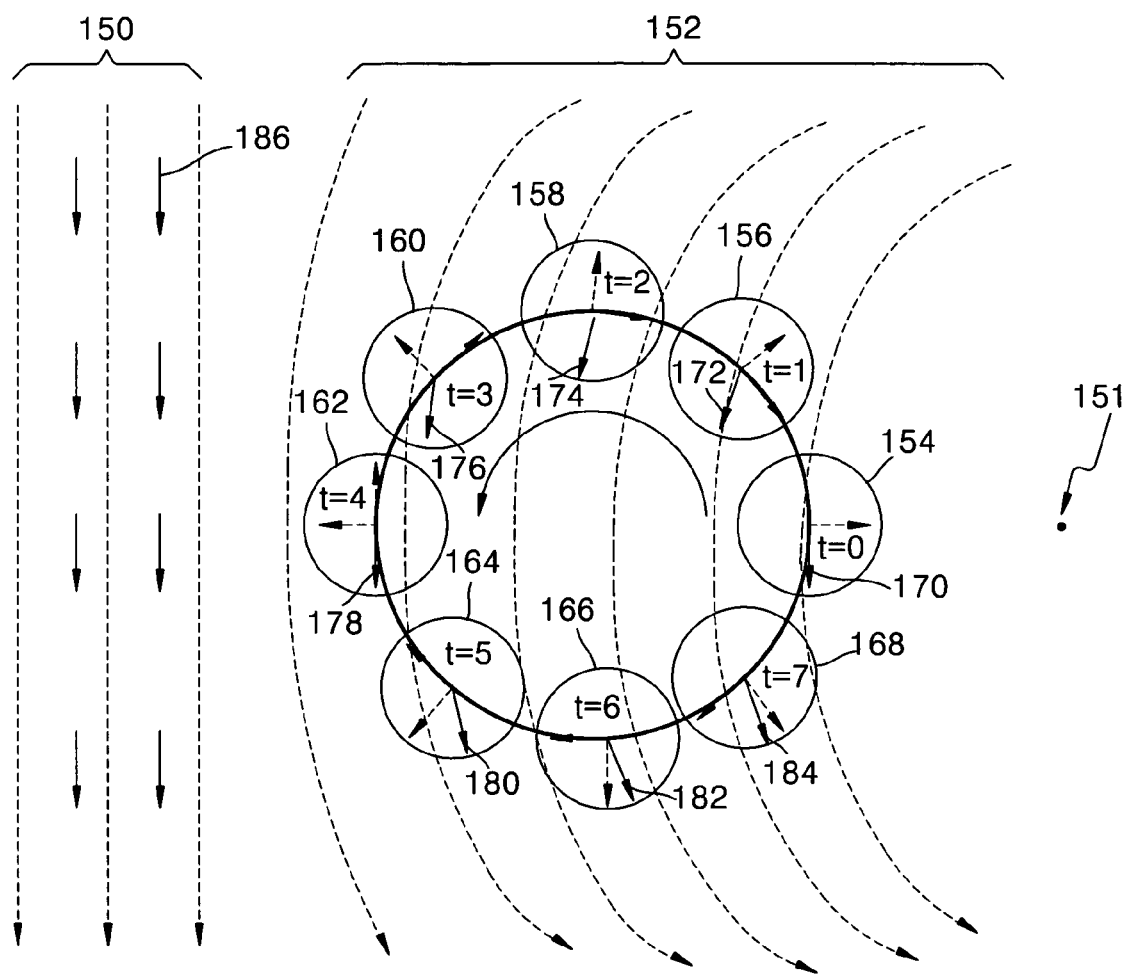
FIG. 14 is a view for showing a traveling figure of a rotating mobile body with a compass location within the region of a curved magnetic flux in which disturbance of a magnetic field exists.

FIG. 14 is a view for showing a traveling figure of a rotating mobile body with compass location 154, 156, 158, 160, 162, 164, 166, or 168 which are captured as the mobile body rotates in a circular motion with uniform velocity within a region 152 of a curved magnetic flux in which a disturbance of the magnetic field exists.

Figure 15:
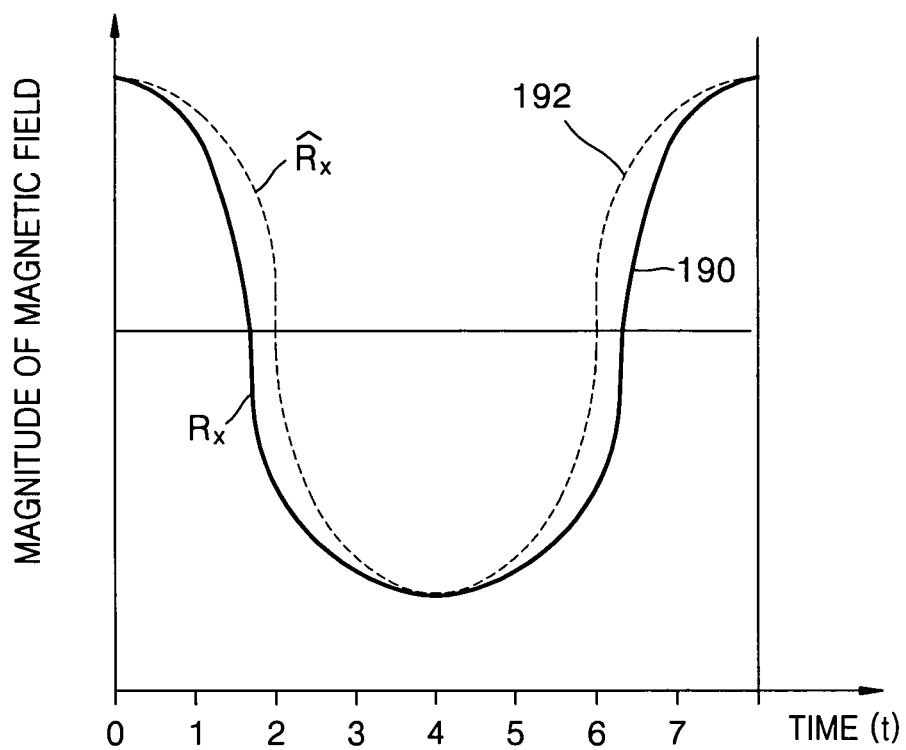
FIG. 15 is a graph for showing a relationship between a magnetic field trajectory of magnetic field data measured in step 132 and a reference curve when a mobile body rotates as shown in FIG. 14.

FIG. 15 is a graph for showing a relationship between a magnetic field trajectory 190 of magnetic field data measured in step 132 and a reference curve 192 when a mobile body rotates as shown in FIG. 14. Here, the horizontal axis denotes time t and the vertical axis denotes the magnitude of a magnetic field.

Referring to FIGS. 14 and 15, when the mobile body moves counterclockwise, a magnetic north 170, 172, 174, 176, 178, 180, 182, or 184 indicated by the compass location 154, 156, 158, 160, 162, 164, 166, or 168 of the mobile body is identical to a direction of a curved magnetic flux. Thus, a magnetic north indicated by a compass is different from a real magnetic north 186 within a region 150 of a linear magnetic flux. When in step 132, the magnitude of the magnetic field is measured at each period of time, i.e., from the first time (t=0) to eighth time (t=7), with the rotation of the mobile body in a direction as shown in FIG. 14, the magnetic field trajectory 190 formed by the magnetic field data may be obtained. Here, the magnetic field trajectory 190 of FIG. 15 may be obtained, for example, from the magnetic field data $R_x$ or $R_y$, and the reference curve 192 may be $\hat{R}_x$ or $\hat{R}_y$ as previously described.

It is assumed that the magnetic field trajectory 190 is distributed lower than the reference curve 192 as shown in FIG. 15. In other words, when it is supposed that the mean value of the trajectory errors is smaller than "0", an origin 151 of a disturbance of the magnetic field is assumed to be located to the left of a magnetic north indicated by a compass. Thus, the compass must be moved so as to be distant from the origin 151 of the disturbance of the magnetic field. For this purpose, a direction in which the compass moves toward a candidate location from the central axis is determined to the right of the magnetic north indicated by the compass.

An amplitude difference and an offset difference may be multiplied by predetermined weights as in Equation 6 below. The multiplication result may be determined as an amount $r_T$ by which the compass moves. The amplitude difference refers to a result of subtraction of a reference amplitude $A_{ex}$ or $A_{ey}$ from the amplitude $A_x$ or $A_y$ of the magnetic field data $R_x$ or $R_y$, and the offset difference refers to a result of subtraction of a reference offset $O_{ex}$ or $O_{ey}$ from the offset $O_x$ or $O_y$ of the magnetic field data $R_x$ or $R_y$.

$$r_T = k_1 \cdot |A_x - A_{ex}| + k_2 \cdot |O_x - O_{ex}| \text{ or } r_T = k_3 \cdot |A_y - A_{ey}| + k_4 \cdot |O_y - O_{ey}| \quad (6)$$

wherein $k_1$, $k_2$, $k_3$, and $k_4$ denote predetermined weights.

If in step 140, it is determined that the number of loops has reached the predetermined value, in step 146, the compass is calibrated using at least one magnetic field data, which is selected from magnetic field data stored as many times as the number of loops in which step 132 of FIG. 13 is performed, using at least one of the reference amplitude, the reference offset, the mean value, and the variance value. The fact that the number of loops has reached the predetermined value means that a location in which the disturbance of the magnetic field does not exist has not been found when the mobile body has rotated as many times as a number of times corresponding to the predetermined value. In other words, in step 146, from a plurality of magnetic field data measured and stored during repetitive executions of step 132, a magnetic field datum is selected, which has a relatively small value in several criteria. The first criterion, which has the highest priority, is the difference between the amplitude and the reference amplitude, the second is the difference between the offset and the reference offset, and the third and the last are the mean value and the variance value of the trajectory errors between the magnetic field trajectory and the reference curve. Then the compass is calibrated using the selected magnetic field data. For example, a value B may be calculated for each of the magnetic field data as in Equation 7 below so as to calibrate the compass using magnetic field data having the smallest value B.

$$B = k_5 \times \text{difference between amplitudes} + k_6 \times \text{difference between offsets} + k_7 \times \text{mean value of trajectory error} + k_8 \times \text{dispersion value of trajectory error} \quad (7)$$

wherein $k_5$, $k_6$, $k_7$, and $k_8$ denote predetermined weights, where $k_5 > k_6 > k_7 > k_8$ The method of using the magnetic field of FIG. 13 may not include steps 130, 138, 140, and 146. In this case, in step 136, the compass is calibrated only when the disturbance of the magnetic field does not exist.

Accordingly, the method of using the magnetic field according to the present invention can be adopted to calibrate a compass used for recognizing an azimuth of a mobile body.

Hereinafter, the structure and operation of an apparatus for using a magnetic field, according to the present invention, will be explained with reference to the attached drawings.

Figure 16:
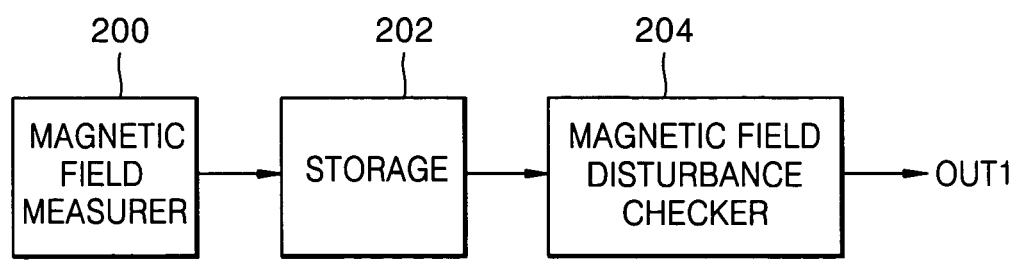
FIG. 16 is a block diagram of an apparatus for using a magnetic field, according to an embodiment of the present invention.

FIG. 16 is a block diagram of an embodiment of an apparatus for using a magnetic field, according to the present invention, including a magnetic field measurer 200, a storage 202, and a magnetic field disturbance checker 204.

The apparatus of FIG. 16 serves to perform the method of FIG. 6.

Referring to FIGS. 6 and 16, to perform step 10, the apparatus includes the magnetic field measurer 200 and the storage 202. The magnetic field measurer 200 rotates in different locations over a space to measure magnetic field data at each period of time. Here, the storage 202 stores the magnetic field data measured by the magnetic field measurer 200.

To execute step 12, the magnetic field disturbance checker 204 checks whether a disturbance of the magnetic field exists, using amplitude and offset of at least one of magnetic field trajectories formed by the magnetic field data stored in the storage 202 and outputs the check result via an output node OUT1.

Figure 17:
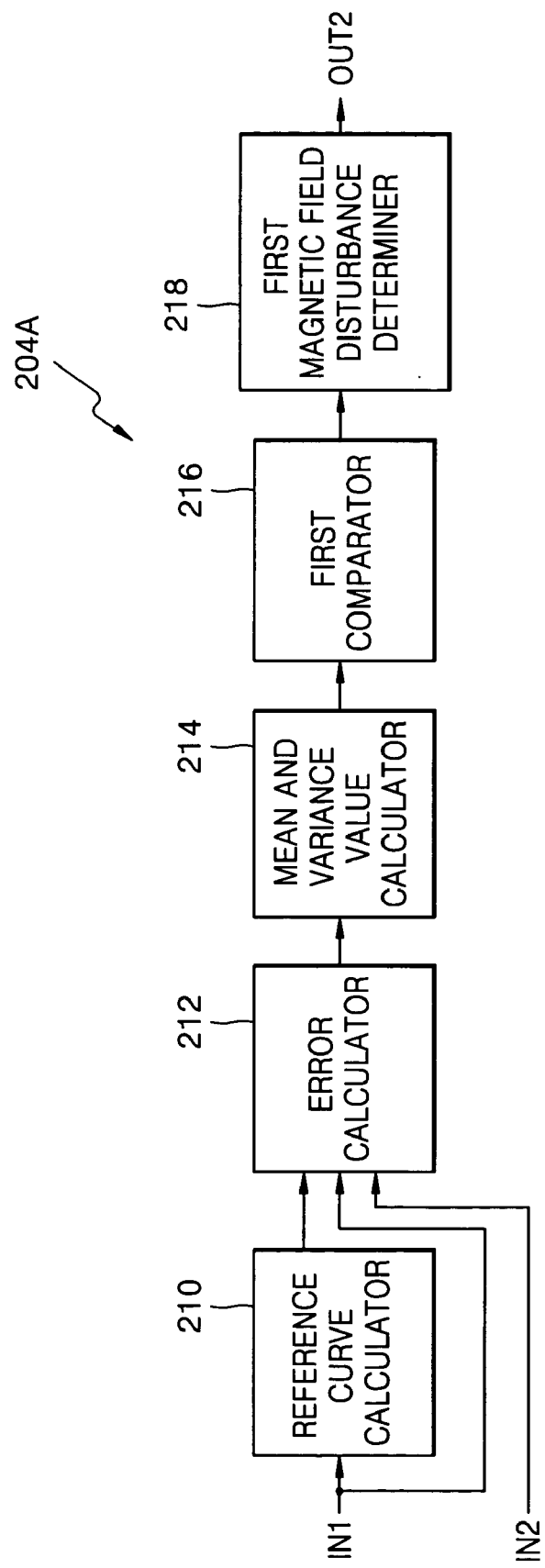
FIG. 17 is a block diagram of a magnetic field disturbance checker of FIG. 16 according to a preferred embodiment 204A of the present invention.

FIG. 17 is a block diagram of a preferred embodiment 204A of the present invention of the magnetic field disturbance checker 204 of FIG. 16, including a reference curve calculator 210, an error calculator 212, a mean and variance value calculator 214, a first comparator 216, and a first magnetic field disturbance determiner 218.

The magnetic field disturbance checker 204A of FIG. 17 serves to perform step 12A of FIG. 8.

Referring to FIGS. 8 and 17, to perform step 30, the reference curve calculator 210 calculates a reference curve from amplitude and offset of magnetic field data that is input from the storage 202 via an input node IN1 as in Equation 1 or 2 above and outputs the reference curve to the error calculator 212.

Supposing that before the method of using the magnetic field, according to the present invention, is carried out, the reference curve is calculated by measuring the magnitude of the magnetic field at each time in different locations over the space in an environment in which the disturbance of the magnetic field does not exist, and so step 12A of FIG. 8 does not include step 30. In this case, the magnetic field disturbance checker 204A of FIG. 17 may not include the reference curve calculator 210, and the error calculator 212 may receive a pre-calculated reference curve via an input node IN2.

To perform step 32, the error calculator 212 calculates a trajectory error between at least one of magnetic field trajectories formed by the magnetic field data that is input from the storage 202 via the input node IN1 and at least one sinusoidal reference curve and outputs the trajectory error to the mean and variance value calculator 214. Here, the error calculator 212 may receive the reference curve from the reference curve calculator 210 or via the input node IN2 as previously described.

To carry out step 34, the mean and variance value calculator 214 calculates at least one of a mean value and a variance value of the trajectory errors input from the error calculator 212 and outputs the at least one of the mean and variance values to the first comparator 216.

To perform step 36, the first comparator 216 compares the mean or variance value input from the mean and variance value calculator 214 with a threshold mean or variance value and outputs the comparison result to the first magnetic field disturbance determiner 218.

To execute steps 38 and 40, the first magnetic field disturbance determiner 218 determines whether the disturbance of the magnetic field exists, in response to the comparison result of the first comparator 216 and outputs the determination result via an output node OUT2. For example, when the first magnetic field disturbance determiner 218 perceives that the mean or variance value has exceeded the threshold mean or variance value from the comparison result of the first comparator 216, the first magnetic field disturbance determiner 218 determines that the disturbance of the magnetic field exists. Otherwise, when the first magnetic field disturbance determiner 218 perceives that the mean and variance value has not exceeded the threshold mean and variance value, the first magnetic field disturbance determiner 218 determines that the disturbance of the magnetic field does not exist.

Figure 18:
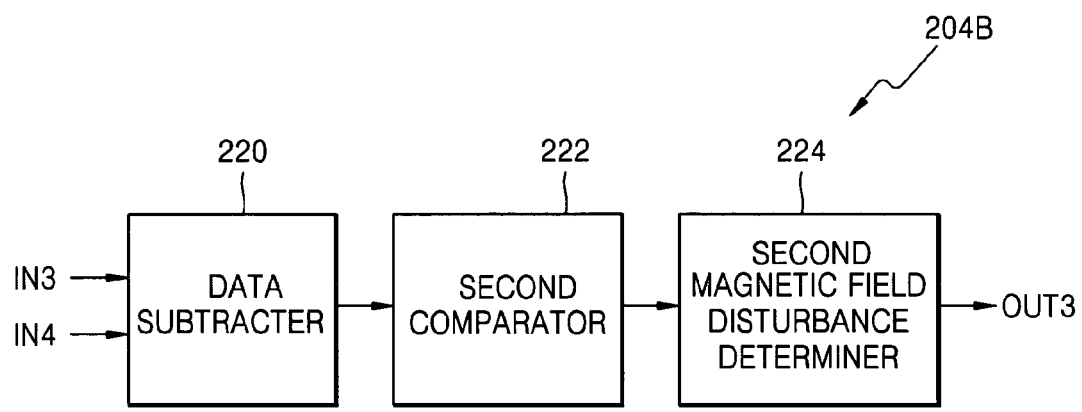
FIG. 18 is a block diagram of the magnetic field disturbance checker of FIG. 16 according to another preferred embodiment 204B of the present invention.

FIG. 18 is a block diagram of another preferred embodiment 204B of the present invention of the magnetic field disturbance checker 204 of FIG. 16, including a data subtracter 220, a second comparator 222, and a second magnetic field disturbance determiner 224.

The magnetic field disturbance determiner 204B of FIG. 18 serves to perform step 12B of FIG. 10.

Referring to FIGS. 10 and 18, to perform step 62, the data subtracter 220 generates at least one value among an amplitude difference and an offset difference and outputs at least one of the generated amplitude differences and the generated offset difference to the second comparator 222. In other words, the data subtracter 220 subtracts a reference amplitude input via an input node IN4 from an amplitude of magnetic field data that is input from the storage 202 via an input node IN3 to generate the amplitude difference. The data subtracter 220 also subtracts a reference offset input via an input node IN4 from an offset of the magnetic field data that is input from the storage 202 via the input node IN3 to generate the offset difference.

To execute step 64, the second comparator 222 receives at least one of the amplitude difference and the offset difference from the data subtracter 220, compares the amplitude or offset difference with a threshold amplitude or offset, and outputs the comparison result to the second magnetic field disturbance determiner 224.

To perform steps 66 and 68, the second magnetic field disturbance determiner 224 determines whether disturbance of the magnetic field exists, in response to the comparison result of the second comparator 222 and outputs the determination result via an output node OUT3. For example, when the second magnetic field disturbance determiner 224 perceives that the amplitude or offset difference has exceeded the threshold amplitude or offset value from the comparison result of the second comparator 222, the second magnetic field disturbance determiner 224 determines that the disturbance of the magnetic field exists. When the second magnetic field disturbance determiner 224 perceives that the amplitude and offset difference has not exceeded the threshold amplitude and offset value from the comparison result of the second comparator 222, the second magnetic field disturbance determiner 224 determines that the disturbance of the magnetic field does not exist.

Figure 19:
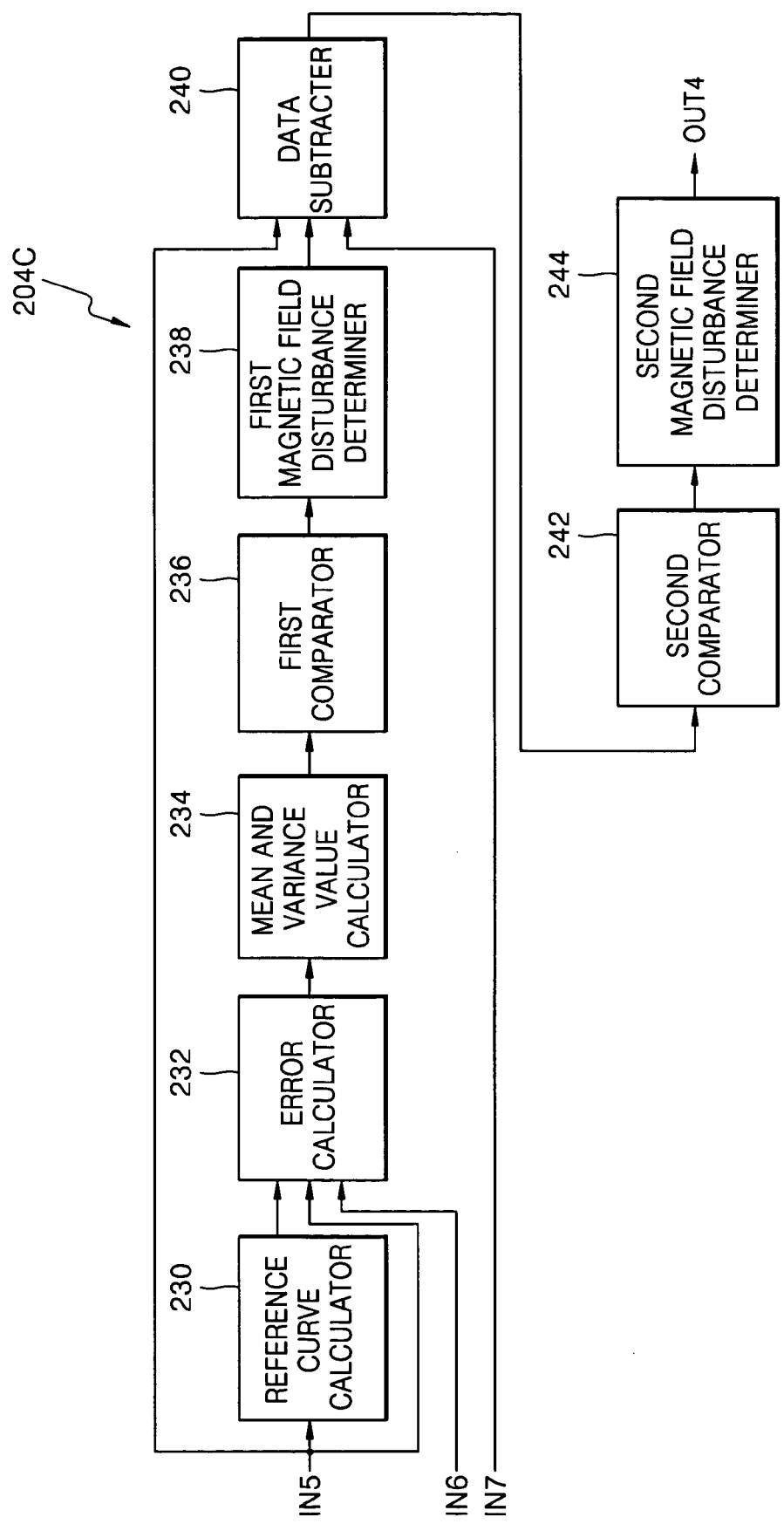
FIG. 19 is a block diagram of the magnetic field disturbance checker of FIG. 16 according to still another preferred embodiment 204C of the present invention.

FIG. 19 is a block diagram of still another preferred embodiment 204C of the present invention of the magnetic field disturbance checker 204 of FIG. 16, including a reference curve calculator 230, an error calculator 232, a mean and variance value calculator 234, a first comparator 236, a first magnetic field disturbance determiner 238, a data subtracter 240, a second comparator 242, and a second magnetic field disturbance determiner 244.

The magnetic field disturbance checker 204C of FIG. 19 serves to perform step 12C of FIG. 12.

Referring to FIGS. 12 and 19, the reference curve calculator 230, the error calculator 232, the mean and variance value calculator 234, and the first comparator 236 of FIG. 19, which perform steps 100, 102, 104, and 106, respectively, correspondingly perform the same functions as the reference curve calculator 210, the error calculator 212, the mean and variance value calculator 214, and the first comparator 216 and thus will not be explained herein. To perform step 108, when the first magnetic field disturbance determiner 238 perceives that a mean or variance value has exceeded a threshold mean or variance value from a comparison result of the first comparator 236, the first magnetic field disturbance determiner 238 determines that a disturbance of the magnetic field exists. When the first magnetic field disturbance determiner 238 perceives that the mean and variance value has not exceeded the threshold mean and variance value from the comparison result of the first comparator 236, the first magnetic field disturbance determiner 238 operates the data subtracter 240 to perform step 110 instead of determining that the disturbance of the magnetic field does not exist. Thus, the first magnetic field disturbance determiner 238 performs the same operation as the first magnetic field disturbance determiner 218 except that the first magnetic field disturbance determiner 238 operates the data subtracter 240.

The data subtracter 240 and the second comparator 242, which perform steps 110 and 112, respectively, perform the same functions as the data subtracter 220 and the second comparator 222 of FIG. 18, respectively, and thus will not be explained herein. However, unlike the data subtracter 220 of FIG. 18, the data subtracter 240 performs step 110 when the first magnetic field disturbance determiner 238 determines that the disturbance of the magnetic field does not exit. The second magnetic field disturbance determiner 244 performs the same operation as the second magnetic field disturbance determiner 224 except that when the second magnetic field disturbance determiner 244 perceives that an amplitude and offset difference has not exceeded a threshold amplitude and offset from a comparison result of the second comparator 242, the second magnetic field disturbance determiner 244 determines that the disturbance of the magnetic field does not exist so as to perform step 114. The second magnetic field disturbance determiner 244 outputs the determination result via an output node OUT4.

According to the present invention, a threshold mean value, a threshold variance value, a threshold amplitude value, and a threshold offset value may be experimentally calculated.

The structure and operation of an apparatus using magnetic field according to another embodiment of the present invention for calibrating a compass using the apparatus of FIG. 16 will now be explained with reference to the attached drawings.

Figure 20:
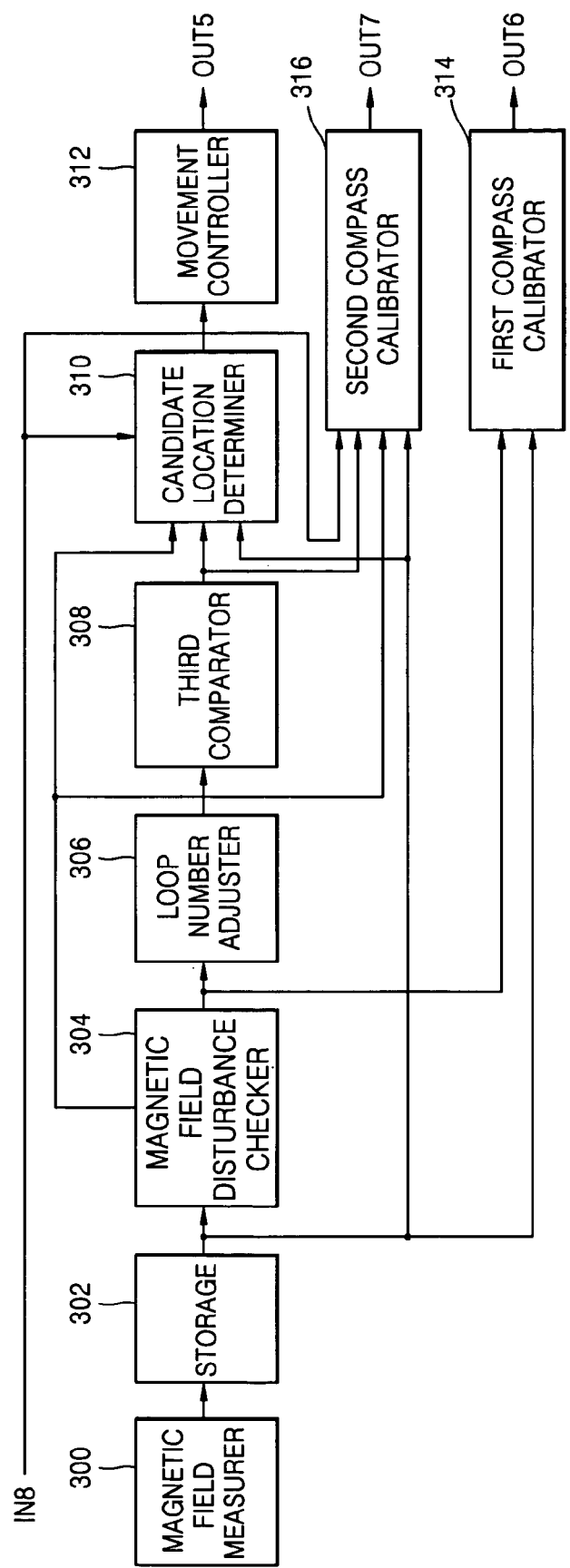
FIG. 20 is a block diagram of an apparatus for using a magnetic field, according to another embodiment of the present invention.

FIG. 20 is a block diagram of an apparatus for using a magnetic field, according to another embodiment of the present invention. Referring to FIG. 20, the apparatus includes a magnetic field measurer 300, a storage 302, a magnetic field disturbance checker 304, a loop number adjuster 306, a third comparator 308, a candidate location determiner 310, a movement controller 312, and first and second compass calibrators 314 and 316.

The apparatus of FIG. 20 serves to perform the process of FIG. 13.

Referring to FIGS. 13 and 20, the magnetic field measurer 300, the storage 302, and the magnetic field disturbance checker 304 perform the same functions as the magnetic field measurer 200, the storage 202, and the magnetic field disturbance checker 204 of FIG. 16, respectively, and thus will not be explained herein. For example, the magnetic field measurer 300 and the storage 302 perform step 132, and the magnetic field disturbance checker 304 performs step 134.

The loop number adjuster 306 performs steps 130 and 138. In other words, to perform step 130, the loop number adjuster 306 initializes the number of loops at an initial stage. To execute step 138, when the magnetic field disturbance checker 304 determines that a disturbance of the magnetic field exists, the loop number adjuster 306 adjusts the number of loops and outputs the adjusted number of loops to the third comparator 308.

To carry out step 140, the third comparator 308 compares the number of loops input from the loop number adjuster 306 with a predetermined value and outputs the comparison result to the candidate location determiner 310.

To perform step 142, in response to the comparison result of the third comparator 308, the candidate location determiner 310 determines a candidate location of the central axis around which a compass rotates using amplitude and offset of magnetic field data input from the storage 302, a mean value input from the magnetic field disturbance checker 304, and a reference amplitude and a reference offset input from an input node IN8 and outputs the determination result to the movement controller 312.

To carry out step 144, the movement controller 312 outputs a control signal for moving the compass so as to correspond to the candidate location inputted from the candidate location determiner 310 via an output node OUT5. As a result, a compass or a mobile body with the compass moves in a direction and by a movement distance included within the candidate location information in response to the control signal output via the output node OUT5.

To execute step 136, when the first compass 314 perceives that the disturbance of the magnetic field does not exist from the check result of the magnetic field disturbance checker 304, the first compass calibrator 314 calibrates the compass using at least one of magnetic field data stored in the storage 302 and outputs the calibration result via an output node OUT6.

To perform step 146, when the second compass calibrator 316 perceives that the number of loops has reached a predetermined value from a comparison result of the third comparator 308, the second compass calibrator 316 selects appropriate magnetic field data of the magnetic field data stored in storage 302 as described above, calibrates the compass using the selected magnetic field data, and outputs the calibration result via an output node OUT7. For example, appropriate magnetic field data may be selected using Equation 7 above. Thus, the second compass calibrator 316 may use at least one of reference amplitude and reference offset input via an input node IN8 and mean and variance values inputted from the magnetic field disturbance checker 304 to select the magnetic field data.

In a case where the process of FIG. 13 does not include steps 130, 138, 140, and 146, the apparatus of 20 does not include the loop number adjuster 306, the third comparator 308, and the second compass calibrator 316. In this case, the candidate location determiner 310 determines the candidate location of the central axis around which the compass moves when the magnetic field disturbance checker 304 determines that the disturbance of the magnetic field exists.

Figure 21:
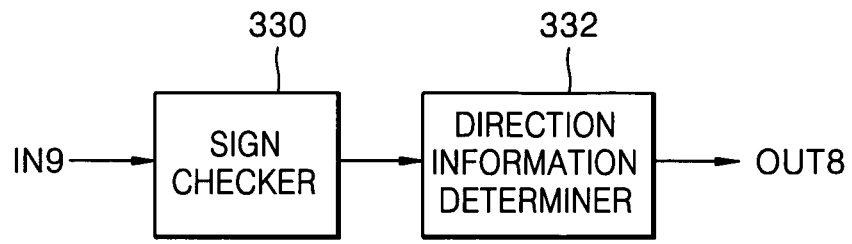
FIG. 21 is a block diagram of a candidate location determiner for determining a direction of a candidate location according to an embodiment of the present invention.

FIG. 21 is a block diagram of an embodiment of the present invention of the candidate location determiner 310 of FIG. 20 for determining a direction of a candidate location, including a sign checker 330 and a direction information determiner 332.

Referring to FIG. 21, the sign checker 330 checks a sign of the mean value input from the magnetic field disturbance checker 304 via an input node IN9 and outputs the check result to the direction information determiner 332. The direction information determiner 332 determines direction information concerning a direction along which the compass moves when traveling to the candidate location from the central axis around which the compass rotates in measuring the magnetic field data by the magnetic field measurer, in response to the check result of the sign checker 330, and outputs the candidate location information including the determined direction information to the movement controller 312 via the output node OUT8. The mean value corresponds to a mean of trajectory errors which are obtained from subtraction of a reference curve from a magnetic field trajectory, as described above.

Figure 22:
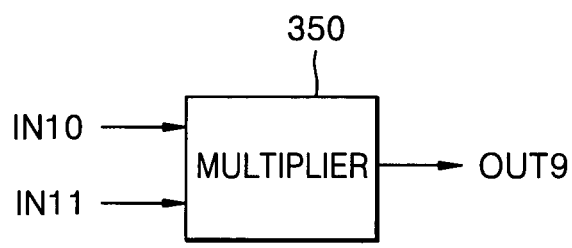
FIG. 22 is a block diagram of the candidate location determiner of FIG. 20 for determining a movement quantity toward the candidate location according to another embodiment of the present invention.

FIG. 22 is a block diagram of another embodiment of the present invention of the candidate location determiner 310 of FIG. 20 for determining the movement amount of the candidate location, including a multiplier 350.

The multiplier 350 of FIG. 22 multiplies the amplitude difference and the offset difference inputted from the magnetic field disturbance checker 304 by predetermined weights as in Equation 6 above and outputs to the movement controller 312 the candidate location information including the multiplication result which accounts for the movement distance by which the compass is to move, via an output node OUT9.

Figure 23:
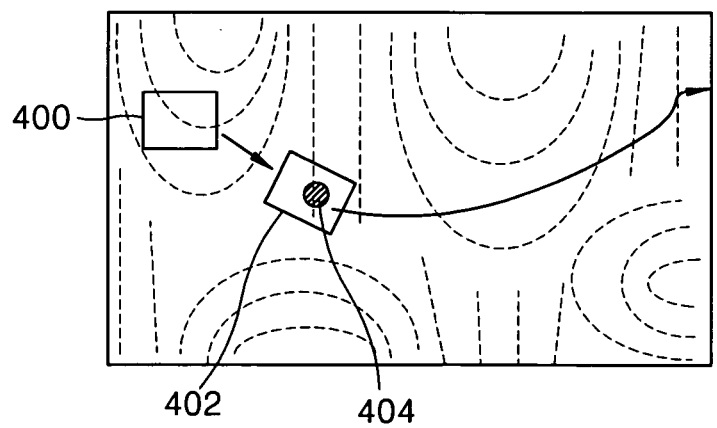
FIG. 23 is a view for 2-dimensionally showing an exemplary traveling figure of a mobile body.

FIG. 23 is a view for 2-dimensionally showing an exemplary traveling figure of a mobile body. Here, dotted lines denote a magnetic flux.

When a compass is calibrated using the method and apparatus for using the magnetic field according to the present invention, it is recognized that a mobile body 400 is first located at a curved magnetic flux region. The mobile body 400 moves to a location 404 in which linear magnetic flux exists. The compass mounted on a mobile body 402, which has moved toward the linear magnetic flux region, is calibrated in the location 404 over an arbitrary linear magnetic flux.

As described above, in a method and apparatus for using a magnetic field, according to the present invention, whether a disturbance of the magnetic field exists can be relatively easily determined without a high-priced magnetic field measurer. Thus, even when magnetic field information concerning the surroundings of a mobile body with a compass is not provided in advance, it can be recognized that the mobile body is located in an environment in which a disturbance of the magnetic field exists. As a result, the mobile body can move, by itself, to a location in which the disturbance of the magnetic field relatively less exists or does not exist so as to further precisely calibrate the compass mounted in the mobile body. Also, the precision of the compass can be guaranteed by calibrating the compass only once without a need to calibrate the compass repetitively in real time,. Moreover, the mobile body, in which the compass must be necessarily calibrated before the mobile body's own function is performed, can be used even in an environment in which the disturbance of the magnetic field exists, i.e., in an indoor environment or an outdoor environment in which a magnetic substance exists.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of using a magnetic field, comprising:
measuring and storing magnetic field data indicating magnitudes of a magnetic field in different directions at each time by rotating sensors in different directions over a space, said magnetic field data forming one or more magnetic field trajectories;
checking whether a disturbance of the magnetic field exists, using an amplitude and an offset of at least one of the magnetic field trajectories;
determining a candidate location of a compass, moving the compass to the candidate location, measuring and storing the magnetic field data indicating the magnitudes of the magnetic field and checking whether the disturbance of the magnetic field exists, until it is determined that the disturbance of the magnetic field does not exist; and
when it is determined that the disturbance of the magnetic field does not exist, calculating the compass by using the stored magnetic field data.

2. The method of claim 1, wherein the checking as to whether the disturbance of the magnetic field exists comprises:
obtaining a trajectory error between at least one of the magnetic field trajectories and at least one sinusoidal reference curve;
obtaining at least one of mean and variance values of the trajectory error;
determining whether the mean or variance value exceeds a threshold mean or variance value; and
when it is determined that the mean or variance value has exceeded the threshold mean or variance value, determining that the disturbance of the magnetic field exists.

3. The method of claim 2, wherein before measuring and storing the magnetic field data indicating the magnitudes of the magnetic field in the different directions at each time, the at least one sinusoidal reference curve is obtained by measuring the magnitudes of the magnetic field in the different directions at each time by rotating the sensors in an environment in which the disturbance of the magnetic field does not exist.

4. The method of claim 2, wherein the checking as to whether the disturbance of the magnetic field exists further comprises:
calculating the at least one sinusoidal reference curve using amplitude and offset of the stored magnetic field data and returning to the step of obtaining the trajectory error between the at least one of the magnetic field trajectories and the at least one sinusoidal reference curve.

5. The method of claim 2, wherein the checking as to whether the disturbance of the magnetic field exists further comprises:
calculating at least one of a difference between amplitude of the stored magnetic field data and a reference amplitude and a difference between offset of the stored magnetic field data and a reference offset;
determining whether the difference between the amplitude and the reference amplitude or the difference between the offset and the reference offset exceeds a threshold amplitude value or a threshold offset value; and
when it is determined that the difference between the amplitude and the reference amplitude or the difference between the offset and the reference offset has exceeded the threshold amplitude value or the threshold offset value, determining that the disturbance of the magnetic field exists.

6. The method of claim 5, wherein before measuring and storing the magnetic field data indicating the magnitudes of the magnetic field in the different directions at each time, the reference amplitude and the reference offset correspond to amplitude and offset over a reference curve that is obtained by measuring the magnitudes of the magnetic field at each time in different directions by rotating the sensors in an environment in which the disturbance of the magnetic field does not exist.

7. The method of claim 5, further comprising:
measuring and storing a predetermined number of test magnetic field data over a space;
selecting test magnetic field data having similar amplitudes and offsets from the stored test magnetic field data;
calculating as error mean and error variance values, respectively, mean and variance values of trajectory errors between each of the selected test magnetic field data and the reference curve; and
determining amplitude and offset of test magnetic field data having relatively small error mean and error variance values as the reference amplitude and the reference offset.

8. The method of claim 5,
wherein the candidate location of the compass is determined by using amplitude and offset of the magnetic field data, the mean value, the reference amplitude, and the reference offset.

9. The method of claim 8, comprising:
initializing a number of loops and returning to the step of measuring and storing the magnetic field data indicating the magnitudes of the magnetic field in the different directions at each time interval;
when it is determined that the disturbance of the magnetic field exists, adjusting the number of loops;
determining whether the number of loops reaches a predetermined value, and when it is determined that the number of loops has not reached the predetermined value, returning to the step of determining the candidate location of the central axis around which the compass rotates using the amplitude and offset of the magnetic field data, the mean value, the reference amplitude, and the reference offset; and
when it is determined that the number of loops has reached the predetermined value, calibrating the compass using at least one of magnetic field data that is selected from the stored magnetic field data using at least one of the reference amplitude, the reference offset, the mean value, and the variance value.

10. The method of claim 8, wherein during the measurement of the magnetic field data, a direction along which the compass is to move to the candidate location from the central axis is determined to the right of a magnetic north indicated by the compass when the mean value is negative and to the left of the magnetic north when the mean value is positive, wherein the mean value corresponds to a mean of the trajectory errors that are results of subtraction of the reference curve from the at least one of the magnetic field trajectories.

11. The method of claim 8, wherein the difference between the amplitude and the reference amplitude and the difference between the offset and the reference offset are multiplied by predetermined weights, the multiplication result is determined as a distance by which the compass is to move, and the distance is comprised in candidate location information.

12. An apparatus for using a magnetic field, comprising:
a magnetic field measurer which measures magnetic field data indicating magnitudes of a magnetic field at each time while rotating sensors in different directions over a space, said magnetic field data forming one or more magnetic field trajectories;
a storage which stores the measured magnetic field data;
a magnetic field disturbance checker which checks whether a disturbance of the magnetic field exists using an amplitude and an offset of at least one of magnetic field trajectories;
a movement controller which determines a candidate location of a compass, moves the compass to the candidate location, measures and stores the magnetic field data indicating the magnitudes of the magnetic field and checks whether the disturbance of the magnetic field exists, until it is determined that the disturbance of the magnetic field does not exist; and
a compass calibrator which calculates the compass by using the stored magnetic field data, when it is determined that the disturbance of the magnetic field does not exist.

13. The apparatus of claim 12, wherein the magnetic field disturbance checker comprises:
an error calculator which calculates a trajectory error between the at least one magnetic field trajectory and at least one sinusoidal reference curve;
a mean and variance value calculator which calculates at least one of mean and variance values of the trajectory error;
a first comparator which compares the at least one of the mean and dispersion values with a threshold mean or variance value; and
a first magnetic field disturbance determiner which determines whether the disturbance of the magnetic field exists in response to the comparison result of the first comparator.

14. The apparatus of claim 13, wherein the at least one sinusoidal reference curve is pre-calculated by measuring the magnitudes of the magnetic field at each time in the different locations in an environment in which the disturbance of the magnetic field does not exist.

15. The apparatus of claim 13, wherein the magnetic field disturbance checker further comprises:
a reference curve calculator which calculates the at least one sinusoidal reference curve from the amplitude and offset of the magnetic field data stored in the storage.

16. The apparatus of claim 13, wherein the magnetic field disturbance checker further comprises:
a data subtracter which generates at least one of an amplitude difference and an offset difference that are obtained by subtracting a reference amplitude and a reference offset from the amplitude and offset of the magnetic field data stored in the storage, respectively;
a second comparator which compares the at least one of the amplitude difference and the offset difference with a threshold amplitude or offset value; and
a second magnetic field disturbance determiner which determines whether the disturbance of the magnetic field exists in response to the comparison result of the second comparator.

17. The apparatus of claim 16, wherein the apparatus calibrates a compass on which sensors sensing the magnitude of magnetic field in the different directions are mounted and which can rotate over the space, the apparatus further comprises:
a first compass calibrator which, when the magnetic field disturbance checker determines that the disturbance of the magnetic field does not exist, calibrates the compass using at least one of the magnetic field data stored in the storage.

18. The apparatus of claim 16, wherein the movement controller comprises:
a candidate location determiner which, when the magnetic field disturbance checker determines that the disturbance of the magnetic field exists, determines a candidate location of a central axis around which the compass rotates using the magnetic field data input from the storage, the mean value, the reference amplitude, and the reference offset; and
a signal generator which generates a control signal for moving the compass so as to correspond to the candidate location.

19. The apparatus of claim 18, further comprising:
a loop number adjuster which, when the magnetic field disturbance checker determines that the disturbance of the magnetic field exists, a number of loops;
a third comparator which compares the number of loops with a predetermined value; and
a second compass calibrator which selects magnetic field data of the magnetic field data stored in the storage using at least one of the reference amplitude, the reference offset, the mean value, and the variance value in response to the comparison result of the third comparator and calibrates the compass using the selected magnetic field data,
wherein the candidate location determiner exists in response to the comparison result of the third comparator.

20. The apparatus of claim 18, wherein the candidate location determiner comprises:
a sign checker which checks a sign of the mean value; and
a direction information determiner which during the measurement of the magnetic field data, determines direction information concerning a direction along which the compass is to move to the candidate location from central axis in response to the check result of the sign checker and outputs the candidate location information comprising the direction information,
wherein the mean value corresponds to a mean of the trajectory errors that are obtained by subtracting the reference curve from the magnetic field trajectory.

21. The apparatus of claim 18, wherein the candidate location determiner further comprises:
a multiplier which multiplies the amplitude difference and the offset difference by predetermined weights and outputs the candidate location information comprising the multiplication result as a distance by which the compass moves.

* * * * *